US010250406B2

United States Patent
Ishizaki

(10) Patent No.: US 10,250,406 B2
(45) Date of Patent: Apr. 2, 2019

(54) COMMUNICATION SYSTEM FOR ALLOWING ONE OF MULTIPLE NODES CONNECTED VIA A NETWORK TO CONTROL HARDWARE OF ANOTHER NODE BY TRANSMITTING INTERRUPT DATA

(71) Applicant: HONDA MOTOR CO., LTD., Tokyo (JP)

(72) Inventor: Ryusuke Ishizaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 162 days.

(21) Appl. No.: 15/189,391

(22) Filed: Jun. 22, 2016

(65) Prior Publication Data
US 2016/0380835 A1 Dec. 29, 2016

(30) Foreign Application Priority Data
Jun. 23, 2015 (JP) ................... 2015-125442

(51) Int. Cl.
*H04L 12/427* (2006.01)
*H04L 12/417* (2006.01)
(Continued)

(52) U.S. Cl.
CPC ............ *H04L 12/417* (2013.01); *H04L 12/42* (2013.01); *H04L 12/427* (2013.01); *H04L 69/325* (2013.01); *H04L 69/322* (2013.01)

(58) Field of Classification Search
CPC ...... H04L 12/42; H04L 12/427; H04L 69/322
See application file for complete search history.

(56) References Cited

U.S. PATENT DOCUMENTS 5,408,610 A * 4/1995 Arakawa ............... H04L 12/433
370/452
6,564,277 B1 * 5/2003 Keen ....................... G06F 13/24
710/260
(Continued)

FOREIGN PATENT DOCUMENTS

JP H10154991 A 6/1998
JP 2000004229 A 1/2000
(Continued)

OTHER PUBLICATIONS

JP Office Action for related application 2015-125442 dated Sep. 26, 2018; 6 pp.

*Primary Examiner* — Jeong S Park
(74) *Attorney, Agent, or Firm* — Armstrong Teasdale LLP

(57) ABSTRACT

In a communication system having multiple nodes communicably connected via a network, at least two of the nodes each includes: a software-operated data generator that executes arithmetic processing using software to generate transmission data to be transmitted to another node; a data transmission unit that sends out the transmission data; a data accepting unit that accepts data transmitted from another node; a software-operated controller that executes arithmetic processing using software based on at least the data accepted by the data accepting unit to control hardware serving as a control target; and an interrupt accepting unit that accepts interrupt data generated by another node and, based on the accepted interrupt data, outputs a hardware control signal to the hardware serving as the control target or other hardware associated with the node such that the hardware is directly controlled based on the hardware control signal without via the software-operated controller.

5 Claims, 19 Drawing Sheets

(51) Int. Cl.
*H04L 29/08* (2006.01)
*H04L 12/42* (2006.01)

(56) References Cited

U.S. PATENT DOCUMENTS

| | | | | |
|---|---|---|---|---|
| 2004/0141461 A1* | 7/2004 | Zimmer | ............ | H04L 41/0663 370/216 |
| 2005/0022073 A1* | 1/2005 | Urashima | ............ | G06F 11/073 714/54 |
| 2006/0182044 A1* | 8/2006 | Maisch | ................ | H04L 12/42 370/258 |
| 2010/0208581 A1* | 8/2010 | Nagano | ................ | H04L 69/40 370/217 |
| 2011/0078353 A1* | 3/2011 | Tsuji | ...................... | H04L 47/10 710/260 |
| 2013/0278191 A1* | 10/2013 | Zushi | .................... | H02H 7/122 318/400.22 |

FOREIGN PATENT DOCUMENTS

| | | | |
|---|---|---|---|
| JP | 2001223743 A | 8/2001 |
| JP | 2001326663 A | 11/2001 |
| JP | 2006515443 A | 5/2006 |
| JP | 2011114625 A | 6/2011 |

* cited by examiner

COMMUNICATION SYSTEM FOR ALLOWING ONE OF MULTIPLE NODES CONNECTED VIA A NETWORK TO CONTROL HARDWARE OF ANOTHER NODE BY TRANSMITTING INTERRUPT DATA

TECHNICAL FIELD

The present invention relates to a communication system including a plurality of nodes communicably connected to each other via a network.

BACKGROUND OF THE INVENTION

Networks connecting a plurality of terminals (nodes) such as computers may have various topologies such as bus, star, ring and mesh topologies. An example of a bus network is Ethernet (registered trademark). Ethernet has a physical star topology but has a logical bus topology, in which each node can freely transmit a signal (data). On the other hand, a signal collision may occur in Ethernet, and in such a case, delivery of the signal is delayed (namely, latency is increased).

Like Ethernet, ring networks often are wired in a physical star topology in which each network node is connected to a central hub. An example of a ring network is Token Ring. In Token Ring, a signal called a "token" travels around a logical ring (token passing), and only a node where the token is present can send data. Namely, the nodes where the token is not present cannot send data, and therefore, collision of data on the network is prevented.

With regard to a communication system having a plurality of nodes connected to each other via Token Ring, it has been proposed to provide, as a flow control system to cope with a load variation at a receiver node without complicating the functions of the nodes, a system in which a sender node includes a send-out means that sends out a set of data addressed to a receiver node and a busy token and a relay means that, upon receipt of the set of data and token sent out by the sender node itself, sends out the set as it is, and a receiver node includes a relay means that, if there is no room to accept data when receiving the set of data and token, sends out the set as it is and an acceptance means that, if there is room to accept data when receiving the set of data and token, accepts the data included in the set (JP2001-326663A).

SUMMARY OF THE INVENTION

However, in the system proposed in JP2001-326663A, when the sender node sends data including embedded control content for controlling hardware of the receiver node, if the receiver node is continuously in a state with no room to accept data, the relay means keeps sending out the data, and thus, the receiver node cannot accept the data to control the hardware.

Further, when one of a plurality of nodes connected with each other via a network controls hardware of another node, typically, the sender node transmits data in the form of a packet or the like including embedded control content, and the receiver node interprets the content of the received (and accepted) data by executing arithmetic processing using software and controls the hardware in accordance with the interpreted content of the data (control content). However, the intervention of software tends to result in a longer processing time, and this makes it difficult to control the hardware at the receiver node promptly even if the receiver node could accept the data from the sender node. Further, in such a case as when the software runs out of control at one node, it may be desirable to control the hardware of the node from another node without via software.

In view of such a prior art problem, a primary object of the present invention is to provide a communication system configured such that one of a plurality of nodes included therein can control hardware of another node without via software by transmitting data to the other node.

To achieve such an object, according to an aspect of the present invention, there is provided a communication system having a plurality of nodes communicably connected via a network, wherein each of at least two of the nodes includes: a software-operated data generator that executes arithmetic processing using software to generate transmission data to be transmitted to another node; a data transmission unit that sends out the transmission data; a data accepting unit that accepts data transmitted from another node; a software-operated controller that executes arithmetic processing using software based on at least the data accepted by the data accepting unit to control hardware serving as a control target; and an interrupt accepting unit that accepts interrupt data generated by another node and, based on the accepted interrupt data, outputs a hardware control signal to the hardware serving as the control target or other hardware associated with the node such that the hardware serving as the control target or the other hardware is directly controlled based on the hardware control signal without via the software-operated controller.

According to this configuration, one of the plurality of nodes (more specifically, one of the at least two of the plurality of nodes) included in the communication system can control the hardware of another node (more specifically, another one of the at least two of the nodes) without via software (or software-operated controller) by transmitting interrupt data to the other node.

Preferably, the hardware serving as the control target or the other hardware associated with the node includes a hardware logic circuit.

According to this configuration, the hardware that may be controlled directly based on the interrupt data without via the software-operated controller can be realized in a simple structure.

In one embodiment, the interrupt accepting unit is configured to output the hardware control signal to the other hardware associated with the node, wherein the other hardware associated with the node is a reset circuit configured to restart the software of the software-operated data generator or the software-operated controller in response to the hardware control signal corresponding to the interrupt data.

When the communication system is used in such severe circumstances that an abnormality may occur to electronic devices, the software may hang and the control of the hardware (control target) by the software-operated controller (arithmetic processing unit) may become impossible to carry out. However, according to the above configuration, when the control of the control target by the arithmetic processing unit becomes impossible to carry out at one node, it is possible to cause the reset circuit to restart the software by transmitting interrupt data from another node.

In another embodiment, the interrupt data is transmitted to the at least two of the plurality of nodes substantially simultaneously from another node, and the hardware serving as the control target of each of the at least two of the plurality of nodes is controlled by the hardware control signal corresponding to the interrupt data, such that operations of the hardware serving as the control targets of the at least two of the plurality of nodes are synchronized with each other.

In a mode where each of the plurality of nodes controls the associated hardware (control target) via software, the latency is relatively large, and therefore, it is difficult to synchronize the operations of the control targets of the plurality of nodes. However, according to the above configuration, it is possible to synchronize the operations of the control targets of the plurality of nodes (more specifically, the at least two of the plurality of nodes).

In yet another embodiment, the network includes a ring network in which the plurality of nodes are communicably connected in a ring fashion so that each node sends data in one direction along the ring, wherein each of the plurality of nodes further includes: a data relay unit that sends out data received from an upstream side of the network to relay the data; and a data output switching unit that switchably outputs one of the data sent out from the data relay unit and the data sent out from the data transmission unit toward another node, wherein the interrupt accepting unit is configured to output the hardware control signal to the other hardware associated with the node, and wherein the other hardware associated with the node is the data output switching unit, and the data output switching unit is configured to output, in response to the hardware control signal corresponding to the interrupt data, the data sent out from the data relay unit.

According to this configuration, because the network is in a ring topology, data collision can be avoided. On the other hand, in the case where the network is in a ring topology, if a communication failure occurs at one node as a result of software hang-up, hardware malfunction or the like, it may adversely affect the communication between the other nodes connected to the network. According to the above configuration, in a case where a communication failure occurs at one node (more specifically, one of the at least two of the plurality of nodes), another node can transmit interrupt data to the one node to cause the one node to perform data relaying and stop outputting data other than the data to be relayed.

In a yet another embodiment, the interrupt accepting unit is configured to output the hardware control signal to the hardware serving as the control target. Such a hardware may be a motor driver for regulating a supply power provided to an electric motor for driving a joint of a robot, for example.

According to this configuration, at an ordinary time the control target of each of the at least two of the plurality of nodes in the communication system is controlled by the software-operated controller that executes arithmetic processing using software based on ordinary data accepted by the data accepting unit, but when necessary, one node can control the hardware of another node promptly by transmitting interrupt data to the other node without via the software-operated controller.

Thus, according to an aspect of the present invention, it is possible to provide a communication system configured such that one of a plurality of nodes included therein can control hardware of another node without via software by transmitting data to the other node.

DETAILED DESCRIPTION OF THE PREFERRED EMBODIMENTS

In the following, an embodiments of a communication system 1 according to an aspect of the present invention will be described with reference to FIGS. 1 to 18.

Figure 1:
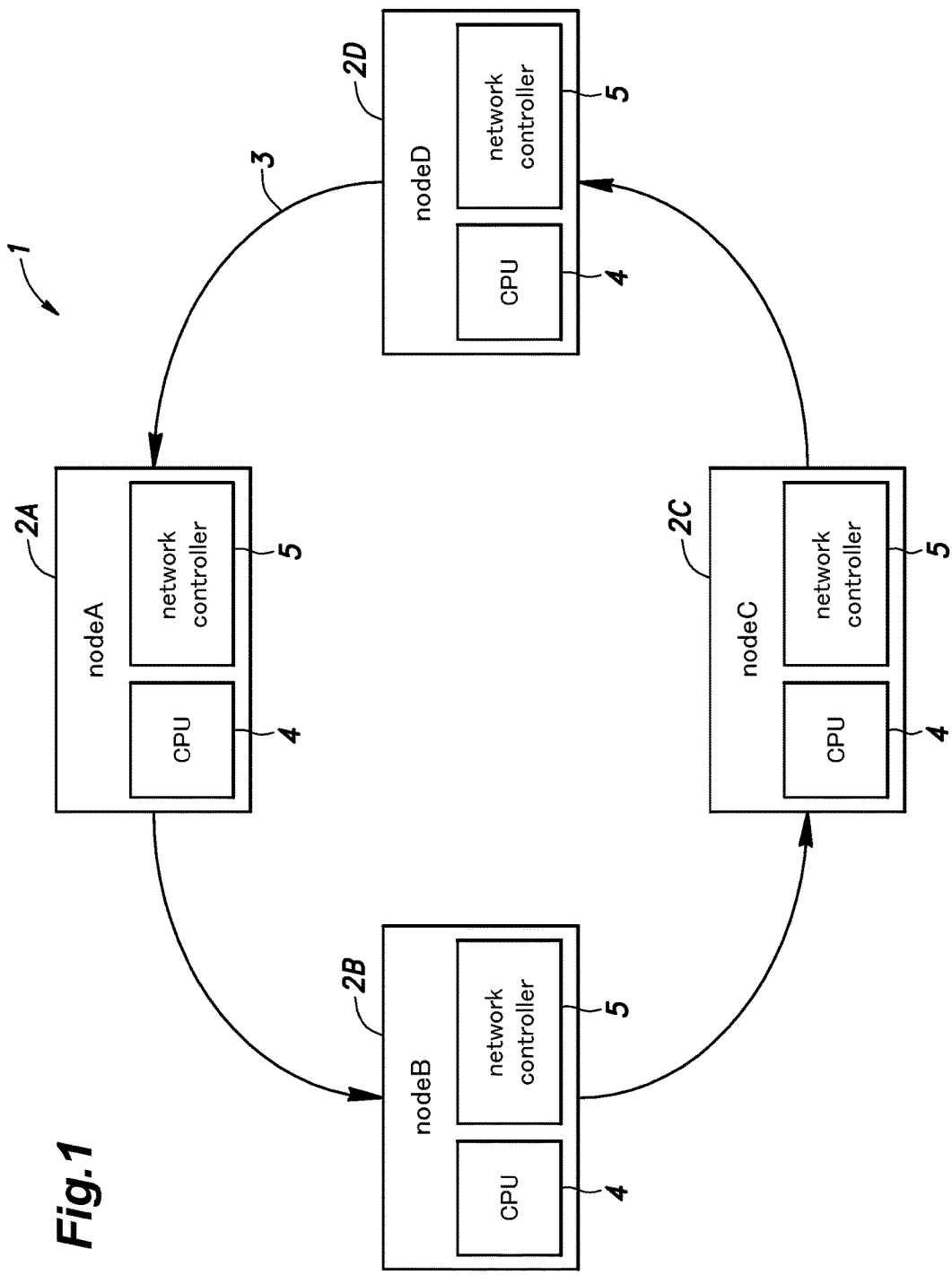
FIG. 1 is a schematic configuration diagram of a communication system according to an embodiment of the present invention.

As shown in FIG. 1, the communication system 1 is constituted of a plurality (four, in the illustrated example) of nodes 2 (2A, 2B, 2C, 2D) and a ring network 3 that communicably connects the nodes 2 in a ring fashion. In this communication system 1, each node 2 has a CPU 4 serving as an arithmetic processing unit and a network controller 5 configured to send data in one direction along the ring of the network 3. Namely, the plurality of nodes 2 are communicably connected in a ring fashion via the ring network 3 such that the data is transmitted from one node to another in one direction along the ring.

It is to be noted that the ring network 3 is a network having a logical ring topology, and does not necessarily have to have a physical ring topology. Further, the "communicable connection" may be implemented as wireless connection instead of physical connection via communication wires.

Each of the plurality of nodes 2 is a control device that executes, with the CPU 4, arithmetic processing using software, and, based on the data output by the arithmetic processing, controls an associated control target 7 (FIG. 2) which consists of hardware. "Hardware" in this embodiment is an electric device electrically connected with a power supply, and may be, for example, an electric motor, a solenoid valve, a lighting apparatus, an electric element, or a driver for controlling the supply of power thereto. For instance, the communication system 1 is installed in a robot that operates autonomously or by remote control, such that the communication system 1 constitutes a distributed control system in which the nodes 2 control various parts of the robot. In this case, the power supply may be mounted on the robot or may not be mounted on the robot but connected to the robot via a power supply line.

Figure 2:
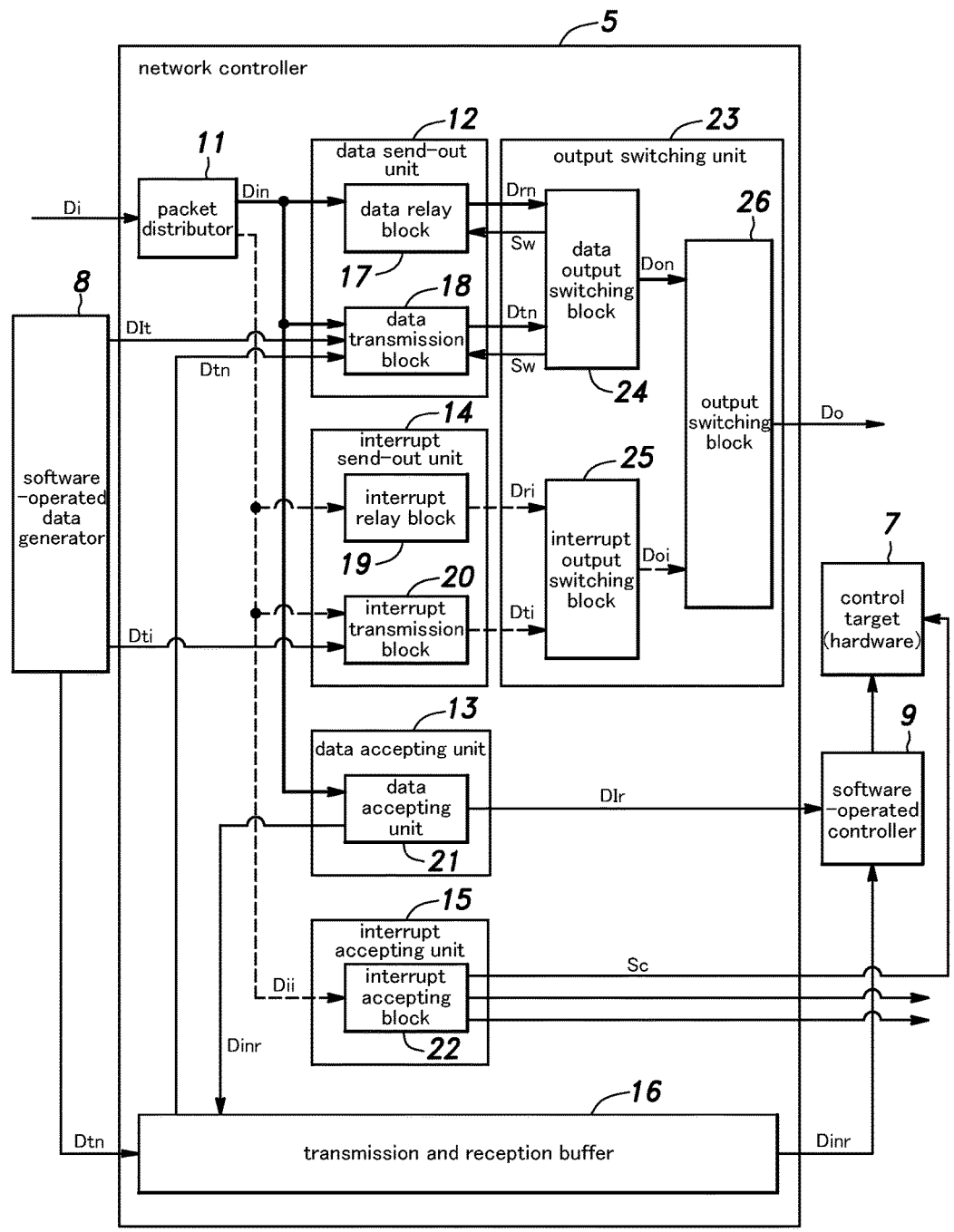
FIG. 2 is a functional block diagram of each node shown in FIG. 1.

As shown in FIG. 2, each node 2 includes: the aforementioned network controller 5 implemented by hardware; a software-operated data generator 8 which is a functional unit that executes, with the CPU 4, arithmetic processing using software to generate data to be transmitted to another node 2; and a software-operated controller 9 which is a functional unit that executes, with the CPU 4, arithmetic processing using software based on at least data received from another node 2 and controls the control target 7 based on the data (control content) obtained by the arithmetic processing. The software-operated data generator 8 generates, as transmission data Dt sent to other nodes 2, two types of data; namely, data used in ordinary control or data to be analyzed by the software-operated controller 9 of another node (hereinafter referred to as ordinary transmission data Dtn) and interrupt transmission data Dti that is generated when it is desired to control hardware of another node without via the software-operated controller 9 and is prioritized than the ordinary transmission data Dtn.

Figure 3:
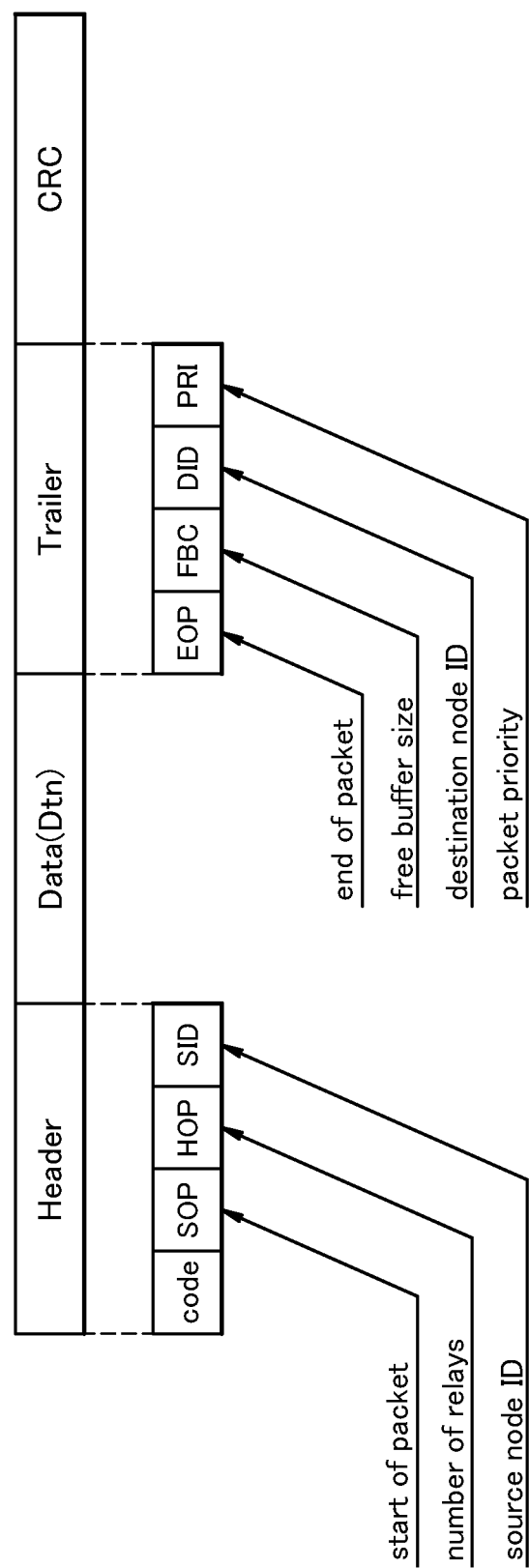
FIG. 3 is a configuration diagram of a data packet.

In each node 2, the data transmitted from an upstream-side node in the network 3 is input to the network controller 5. Each item of data communicated on the network 3 is transferred as a packet. As shown in FIG. 3, a packet containing ordinary transmission data Dtn (namely, data packet) is constituted of a frame including a header, data (Dtn), trailer and CRC. The header is constituted of a code, start of packet (SOP), number of relays (hop count) (HOP) and source node ID (SID). The trailer is constituted of an end of packet (EOP), free buffer size (FBC), destination node ID (DID) and packet priority (PRI).

Figure 4:
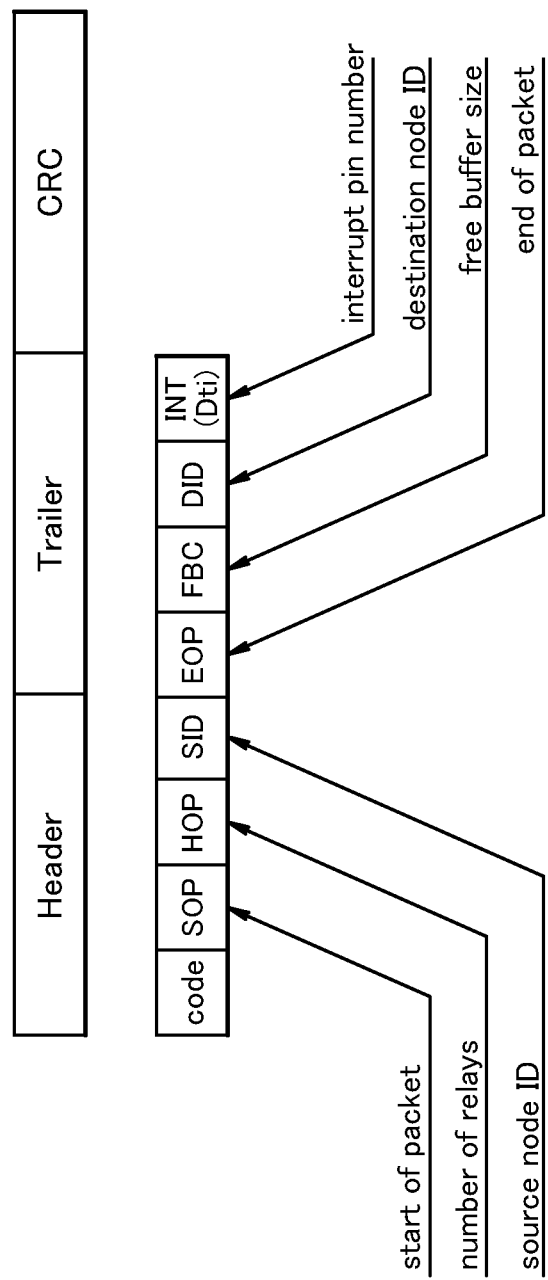
FIG. 4 is a configuration diagram of an interrupt packet.

On the other hand, a packet containing interrupt transmission data Dti (hereinafter may be referred to as an interrupt packet or, simply, interrupt data) is constituted of a frame including a header, trailer and CRC, as shown in FIG. 4. Namely, the interrupt packet does not include the data (Dtn) shown in FIG. 3, which is to be analyzed by the software-operated controller 9 of another node. The header of the interrupt packet is constituted of a code, start of packet (SOP), number of relays (HOP) and source node ID (SID), similarly to the header of the data packet. On the other hand, the trailer of the interrupt packet is constituted of an end of packet (EOP), free buffer size (FBC), destination node ID (DID) and interrupt pin number (INT). Namely, because the interrupt packet is prioritized than the data packet as described above, the trailer of the interrupt packet does not include the packet priority (PRI) shown in FIG. 3, but instead includes the interrupt pin number (INT). This interrupt pin number (INT) indicates an interrupt pin of hardware of another node to be controlled, and the interrupt transmission data Dti consists of an interrupt pin number (INT). It is also to be noted that each node may be associated with multiple items of hardware and each item of hardware may have multiple interrupt pins corresponding to different modes of operation. In such a case, the interrupt pin numbers can be predetermined such that one interrupt pin number specifies a specific interrupt pin of a specific item of hardware.

Referring back to FIG. 2, the network controller 5 includes a packet distributor 11, and input data Di transmitted from another node 2 and input to the packet distributor 11 is distributed to later-described various units (blocks) in the own node 2 by the packet distributor 11. The input data Di also is one of two types; namely, data used in ordinary control (hereinafter referred to as ordinary input data Din), which is ordinary transmission data Dtn generated by another or own node 2, and interrupt input data Dii which is interrupt transmission data Dti generated by another or own node 2 and is prioritized than the ordinary input data Din. In FIG. 2, data packets containing ordinary input data Din are shown in bold solid lines, and interrupt packets containing interrupt input data Dii (INT) are shown in broken lines.

In a case where the packet input to the packet distributor 11 is a packet containing ordinary input data Din, the packet distributor 11 distributes the packet to each of a data send-out unit 12 and a data accepting unit 13. On the other hand, in a case where the packet input to the packet distributor 11 is a packet containing interrupt input data Dii, the packet distributor 11 distributes the packet to each of an interrupt send-out unit 14 and an interrupt accepting unit 15. In the following description, a packet containing ordinary input data Din may be simply referred to as ordinary input data Din and a packet containing interrupt input data Dii may be simply referred to as interrupt input data Dii, and similar simplification may be applied to a packet containing other kind of data.

The software-operated data generator 8 writes the generated ordinary transmission data Dtn addressed to another node 2 in a transmission and reception buffer 16, and writes information relating to the ordinary transmission data Dtn such as a code, priority, etc. (hereinafter referred to as transmission data information DIt) in the data send-out unit 12 (more specifically, in a transmission data information storage buffer 40, which will be described later with reference to FIG. 6). Further, the software-operated data generator 8 writes the generated interrupt transmission data Dti addressed to another node 2 in the interrupt send-out unit 14 (more specifically, in a first write register 71 of an interrupt transmission block 20, which will be described later with reference to FIG. 10).

The data send-out unit 12 includes a data relay block 17 and a data transmission block 18. The data relay block 17 is configured to, when the destination of ordinary input data Din distributed from the packet distributor 11 is not the own node, send out the ordinary input data Din as it is as ordinary relay data Drn. The data transmission block 18 is configured to send out ordinary transmission data Dtn that is generated by the software-operated data generator 8 to be addressed to another node 2. The data transmission block 18 performs a later-described transmission completion determination based on the ordinary input data Din distributed from the packet distributor 11, and reads out, from the transmission and reception buffer 16, the ordinary transmission data Dtn corresponding to the transmission data information DIt written by the software-operated data generator 8, and sends out the read-out ordinary transmission data Dtn.

The interrupt send-out unit 14 includes an interrupt relay block 19 and an interrupt transmission block 20. The interrupt relay block 19 is configured to, when the destination of interrupt input data Dii distributed from the packet distributor 11 is not the own node, send out the interrupt input data Dii as it is as interrupt relay data Dri. The interrupt transmission block 20 is configured to send out interrupt transmission data Dti that is generated by the software-operated data generator 8 to be addressed to another node 2.

The data accepting unit 13 includes a data accepting block 21. When the destination of the ordinary input data Din distributed from the packet distributor 11 is the own node and hence the ordinary input data Din should be accepted, the data accepting block 21 accepts the ordinary input data Din as reception data Dinr and writes it in the transmission and reception buffer 16.

The interrupt accepting unit 15 includes an interrupt accepting block 22. When the destination of the interrupt input data Dii distributed from the packet distributor 11 is the own node, the interrupt accepting block 22 accepts the interrupt input data Dii and sends out a hardware control signal Sc to the hardware in accordance with the accepted interrupt input data Dii.

The ordinary relay data Drn sent out from the data relay block 17, the ordinary transmission data Dtn sent out from the data transmission block 18, the interrupt relay data Dri sent out from the interrupt relay block 19, and the interrupt transmission data Dti sent out from the interrupt transmission block 20 are input to an output switching unit 23.

In the output switching unit 23, a data output switching block 24 outputs one of the ordinary relay data Drn and the ordinary transmission data Dtn as ordinary send-out data Don to be output toward another node 2; namely, switches the ordinary send-out data Don between the ordinary relay data Drn and the ordinary transmission data Dtn. Further, an interrupt output switching block 25 outputs one of the interrupt relay data Dri and the interrupt transmission data Dti as interrupt send-out data Doi to be output toward another node 2; namely, switches the interrupt send-out data Doi between the interrupt relay data Dri and the interrupt transmission data Dti. Further, an output switching block 26 outputs, as output data Do, one of the ordinary send-out data Don output from the data output switching block 24 and the interrupt send-out data Doi output from the interrupt output switching block 25; namely, switches the output data Do between the ordinary send-out data Don and the interrupt send-out data Doi.

It is to be noted that not all of the nodes 2 necessarily have to include the all functional units described above. For instance, it is possible that one node 2 is configured to generate interrupt transmission data Dti with the software-operated data generator 8 and to include the interrupt transmission block 20, while another nodes 2 is configured not to include the interrupt transmission block 20 and the interrupt output switching block 25. However, every node 2 is configured to include at least the data send-out unit 12 (namely, the data relay block 17 and the data transmission block 18), the interrupt relay block 19, the data accepting block 21, the interrupt accepting block 22 and the software-operated controller 9.

In the following, detailed explanation will be made of various parts of the node 2.

Figure 5:
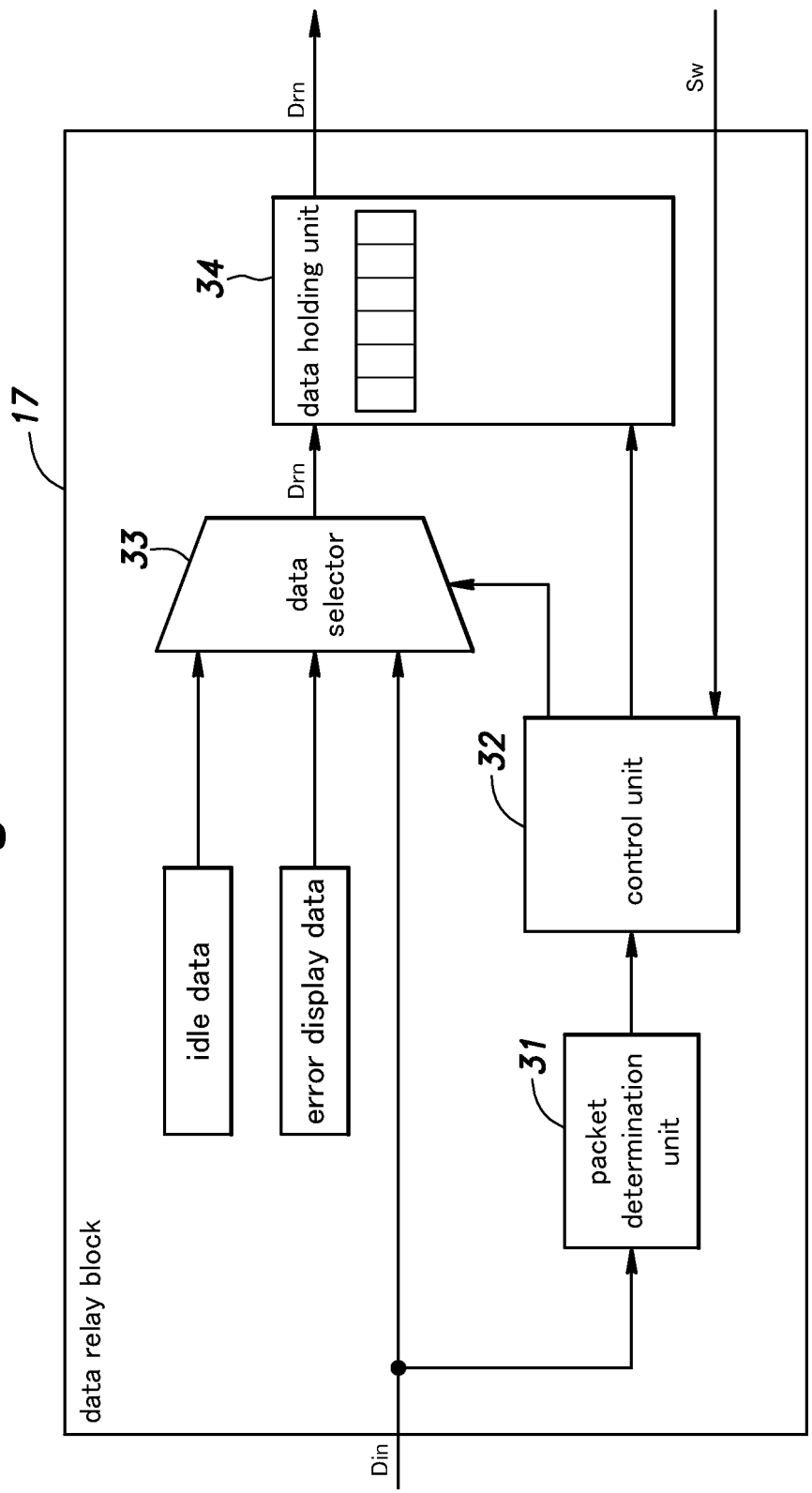
FIG. 5 is a functional block diagram of a data relay block shown in FIG. 2.

As shown in FIG. 5, in the data relay block 17, a packet determination unit 31 performs a relay determination with respect to the ordinary input data Din. Specifically, the packet determination unit 31 determines, based on the source node ID (SID) included in the transmission data information DIt of the ordinary input data Din, whether the ordinary input data Din is data generated by the own node. Further, the packet determination unit 31 determines whether there is a relay error based on the number of relays (HOP) included in the transmission data information DIt, specifically, based on whether the number of relays is greater than or equal to the number of nodes 2 in the network 3.

Based on the result of determination by the packet determination unit 31, a control unit 32 relays or discards the ordinary input data Din. Specifically, when the ordinary input data Din is data generated by the own node, the control unit 32 discards the ordinary input data Din as data that has circulated one round through the ring of the network 3.

Further, when the number of relays of the ordinary input data Din is greater than or equal to the number of nodes 2, the control unit 32 discards the ordinary input data Din as abnormal data, and adds error display data. It is to be noted that an output standby signal Sw is input to the control unit 32 from a later-described control unit 62 (see FIG. 8) of the data output switching block 24.

On the other hand, when it is determined by the packet determination unit 31 that the ordinary input data Din is normal and should be ordinary relay data Drn to be relayed, the control unit 32 increments the number of relays of the ordinary input data Din (ordinary relay data Drn), and controls data selection performed by a data selector 33 such that the data selector 33 selects the ordinary input data Din as the ordinary relay data Drn to be output. Further, the control unit 32 controls data input and output in relation to a data holding unit 34 in accordance with the output standby signal Sw. The data selector 33 selects one of idle data, error display data and ordinary input data Din (ordinary relay data Drn) in accordance with an instruction from the control unit 32, and writes the ordinary relay data Drn in the data holding unit 34. When the control unit 32 outputs a data output instruction in a state where the output standby signal Sw is not input to the control unit 32, the data holding unit 34 sends out the ordinary relay data Drn held therein.

The control unit 32 of the data relay block 17 is configured by hardware programmed to perform the above-described predetermined operations. As the hardware implementing the control unit 32, a hardware logic circuit such as an ASIC (Application Specific Integrated Circuit), PLD (Programmable Logic Device), ASSP (Application Specific Standard Product), etc. may be used. When an ASIC is used, it may be a master slice type such as a gate array, a structured ASIC and so on or may be a custom type such as a cell-based ASIC, etc. When a PLD is used, it may be a PLD in a narrow sense including a Simple PLD and a CPLD (Complex PLD) or may be a PLD in a wide sense which further includes an FPGA (Field-Programmable Gate Array). Preferably, the hardware consists of a PLD. Also, each of the later-described control units 42, 52, 62, 73, 82 of various units (blocks) of the network controller 5 is configured by hardware in a similar manner.

Figure 6:
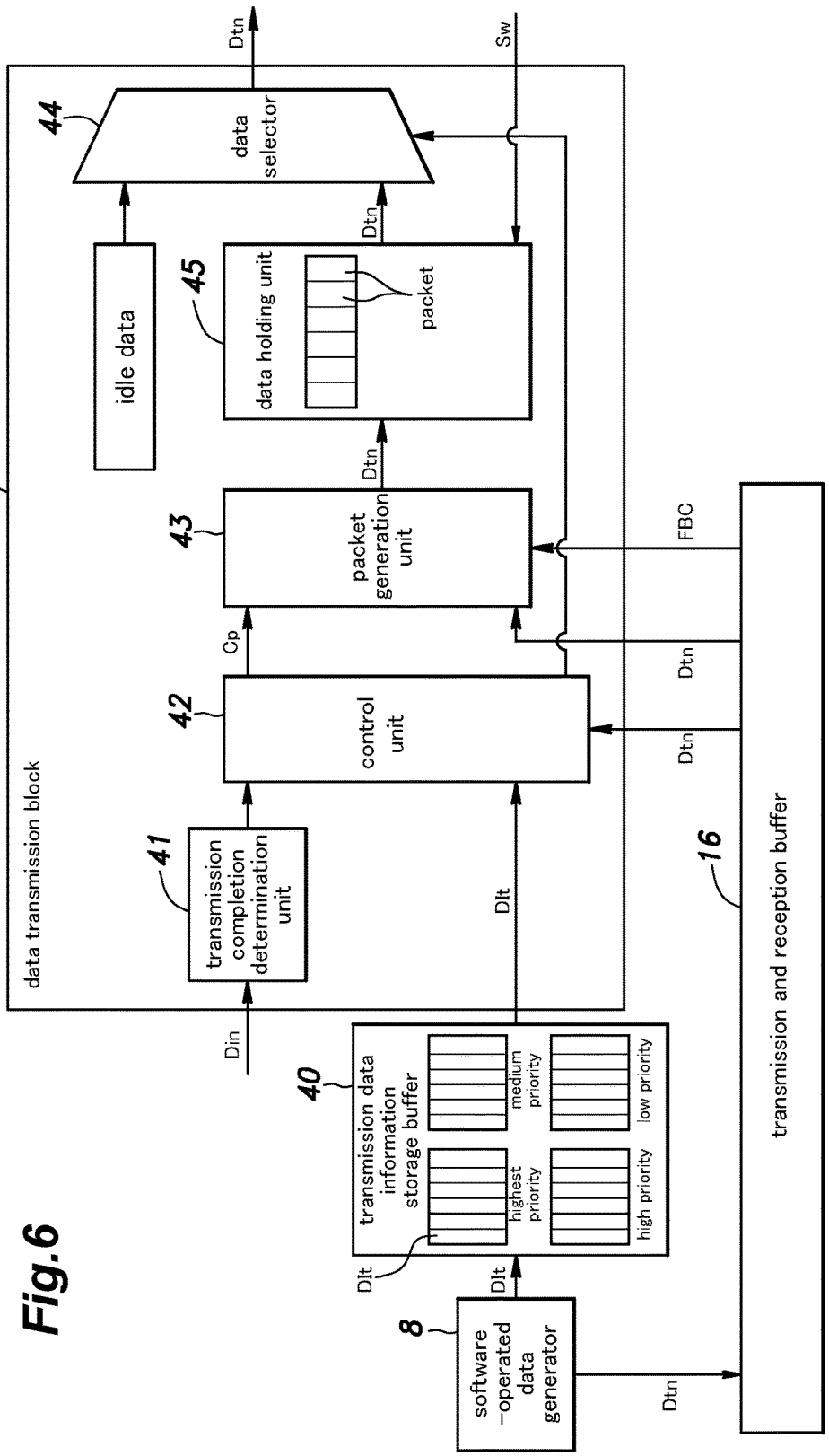
FIG. 6 is a functional block diagram of a data transmission block shown in FIG. 2.

As shown in FIG. 6, the data transmission block 18 is configured to receive the ordinary input data Din distributed from the packet distributor 11. The data transmission block 18 includes a transmission completion determination unit 41 that performs transmission completion determination based on the ordinary input data Din. Specifically, when the ordinary input data Din is identical with ordinary transmission data Dtn previously transmitted from the own node, namely, when it is determined that the ordinary transmission data Dtn previously transmitted from the own node has returned after circulating the ring of the network 3 one round, the transmission completion determination unit 41 determines that the transmission of the ordinary transmission data Dtn is completed. The result of determination by the transmission completion determination unit 41 is sent to a control unit 42.

A transmission data information storage buffer 40 is provided to store the transmission data information DIt of the ordinary transmission data Dtn generated by the software-operated data generator 8. As described above, each ordinary transmission data Dtn is given a certain level of priority (e.g., highest priority, high priority, medium priority, low priority, etc.) by the software-operated data generator 8. In the data transmission block 18, the control unit 42 retrieves items of transmission data information DIt stored in the transmission data information storage buffer 40 in a queue according to the priority, such that one with a higher priority is retrieved earlier, and reads out an item of ordinary transmission data Dtn corresponding to the retrieved item of transmission data information DIt from the transmission and reception buffer 16. The control unit 42 further generates packet generation command Cp and sends out the packet generation command Cp to a packet generation unit 43. The control unit 42 controls the above process such that, until the transmission completion determination unit 41 determines that the transmission of a previously transmitted data packet containing ordinary transmission data Dtn has been completed, the data to be transmitted next is not read out from the transmission and reception buffer 16. Further, the control unit 42 controls data selection performed by a later-described data selector 44.

The packet generation unit 43 reads out ordinary transmission data Dtn from the transmission and reception buffer 16 in response to the packet generation command Cp from the control unit 42, and generates a data packet containing the ordinary transmission data Dtn. In this process, the packet generation unit 43 reads in related information such as a free buffer size (FBC) from the transmission and reception buffer 16 and embeds the information in the data packet. The data packet containing the ordinary transmission data Dtn generated by the packet generation unit 43 is temporarily held in a data holding unit 45 and, if the output standby signal Sw from the control unit 62 (see FIG. 8) of the data output switching block 24 is not input to the data holding unit 45, sent out to the data selector 44. The data selector 44 selects one of idle data and the ordinary transmission data Dtn in accordance with the command from the control unit 42 and sends out the selected data as ordinary transmission data Dtn.

Figure 7:
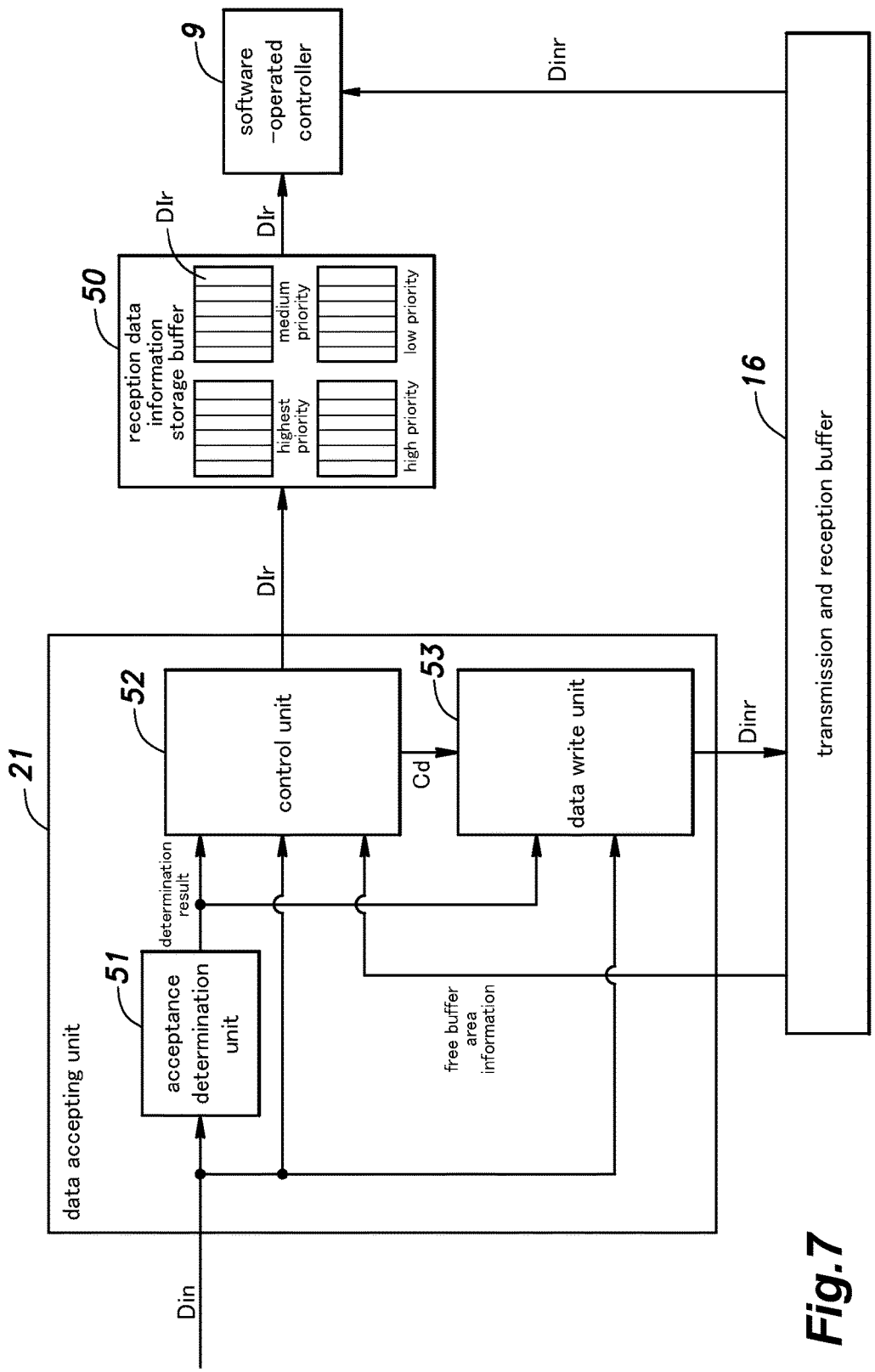
FIG. 7 is a functional block diagram of a data accepting block shown in FIG. 2.

As shown in FIG. 7, in the data accepting block 21, an acceptance determination unit 51 analyzes the ordinary input data Din that has been input, and executes an acceptance determination to determine whether to accept the ordinary input data Din. Specifically, the acceptance determination unit 51 determines to accept the ordinary input data Din when the destination node ID (DID) of the ordinary input data Din indicates the own node, and determines not to accept the ordinary input data Din when the destination node ID does not indicate the own node.

In the data accepting block 21, a control unit 52 acquires, from the transmission and reception buffer 16, information on the free (or writable) buffer area in the transmission and reception buffer 16. When the control unit 52 is provided with a determination result from the acceptance determination unit 51 that the ordinary input data Din that has been input should be accepted, the control unit 52 sends out a buffer write command Cd to a data write unit 53, the buffer write command Cd specifying where in the free buffer area the ordinary input data Din should be written. Upon receipt of the determination from the acceptance determination unit 51 that the data Din should be accepted and the buffer write command Cd from the control unit 52, the data write unit 53 writes the ordinary input data Din at the specified position in the transmission and reception buffer 16 as reception data Dinr.

Further, the control unit 52 adds the write position in the buffer to the information relating to the reception data Dinr (or the ordinary input data Din that has been input) (hereinafter referred to as reception data information DIr), and checks the priority (PRI) included in the reception data information DIr to write the reception data information DIr in a reception data information storage buffer 50 to form a queue in which items of reception data information DIr written in the buffer 50 are arranged in accordance with their priorities. The items of reception data information DIr written in the reception data information storage buffer 50 are retrieved by the software-operated controller 9 in the descending order of priority (namely, an item of reception data information DIr with a higher priority is retrieved earlier).

The software-operated controller 9 reads out, from the transmission and reception buffer 16, the reception data Dinr corresponding to the retrieved reception data information DIr, and, based on at least the read-out reception data Dinr, controls the hardware serving as the control target 7 (FIG. 2). For example, the software-operated controller 9 controls a motor driver for regulating the supply power provided to an electric motor for driving a joint of a robot.

Figure 8:
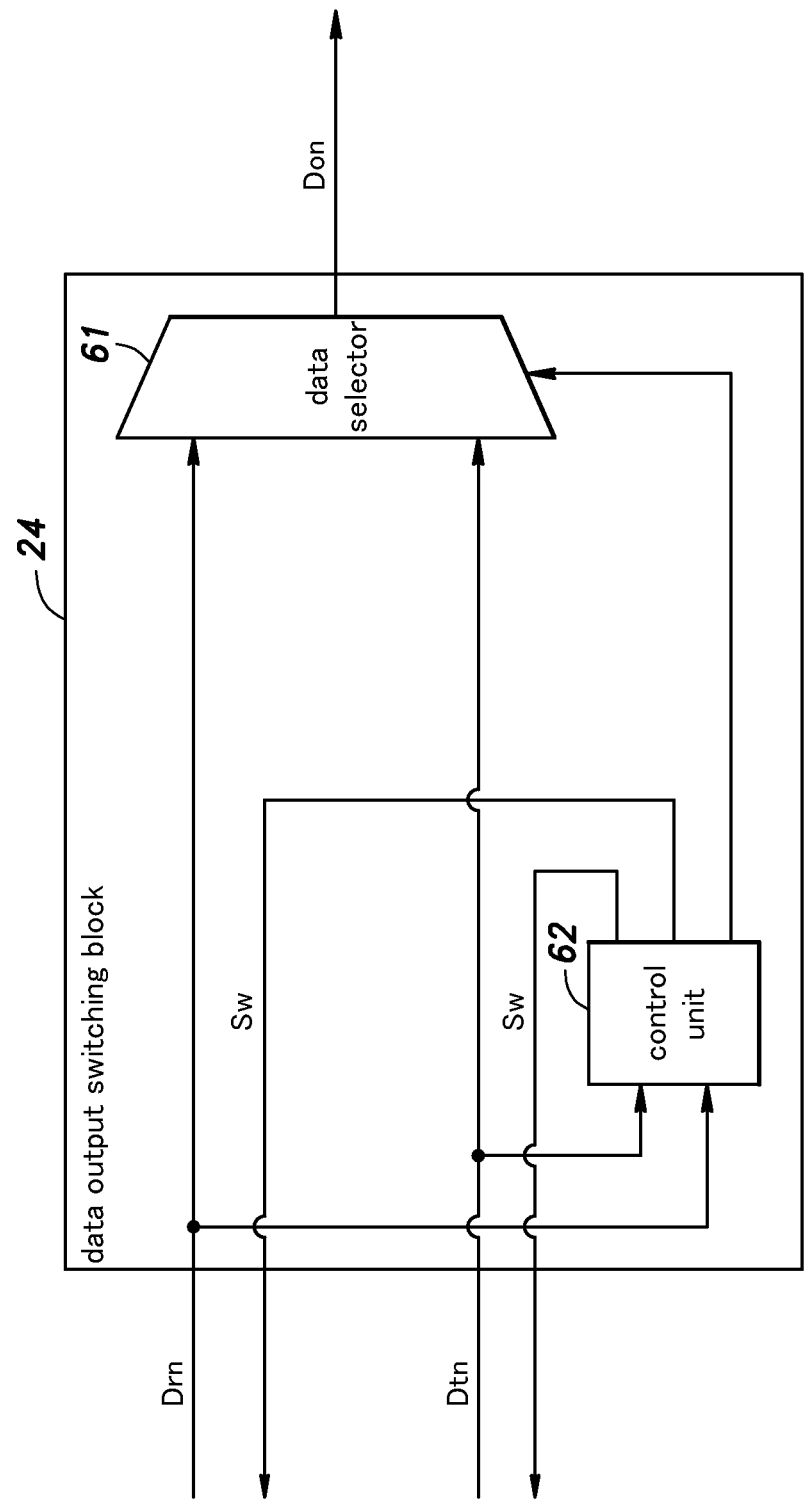
FIG. 8 is a functional block diagram of a data output switching block shown in FIG. 2.

As shown in FIG. 8, the data output switching block 24 is configured to receive ordinary relay data Drn sent out from the data holding unit 34 of the data relay block 17 (FIG. 5) and ordinary transmission data Dtn sent out from the data selector 44 of the data transmission block 18 (FIG. 6). The data output switching block 24 includes a data selector 61 and a control unit 62, to each of which the ordinary relay data Drn and the ordinary transmission data Dtn are input. The control unit 62 controls data selection performed by the data selector 61 based on the ordinary relay data Drn and the ordinary transmission data Dtn input thereto, and outputs an output standby signal Sw for each of the data relay block 17 (FIG. 5) and the data transmission block 18 (FIG. 6).

The data selector 61 selects one of the ordinary relay data Drn and the ordinary transmission data Dtn in accordance with an instruction from the control unit 62, and outputs the selected data as ordinary send-out data Don. The control unit 62 outputs the instruction so as to cause the data selector 61 to output the ordinary transmission data Dtn more preferentially than the ordinary relay data Drn. Further, while one of the ordinary relay data Drn and the ordinary transmission data Dtn is being output, in order to prevent collision with input of the other, the control unit 62 outputs the output standby signal Sw to the data relay block 17 or the data transmission block 18 until the data output of one packet is completed.

Figure 9:
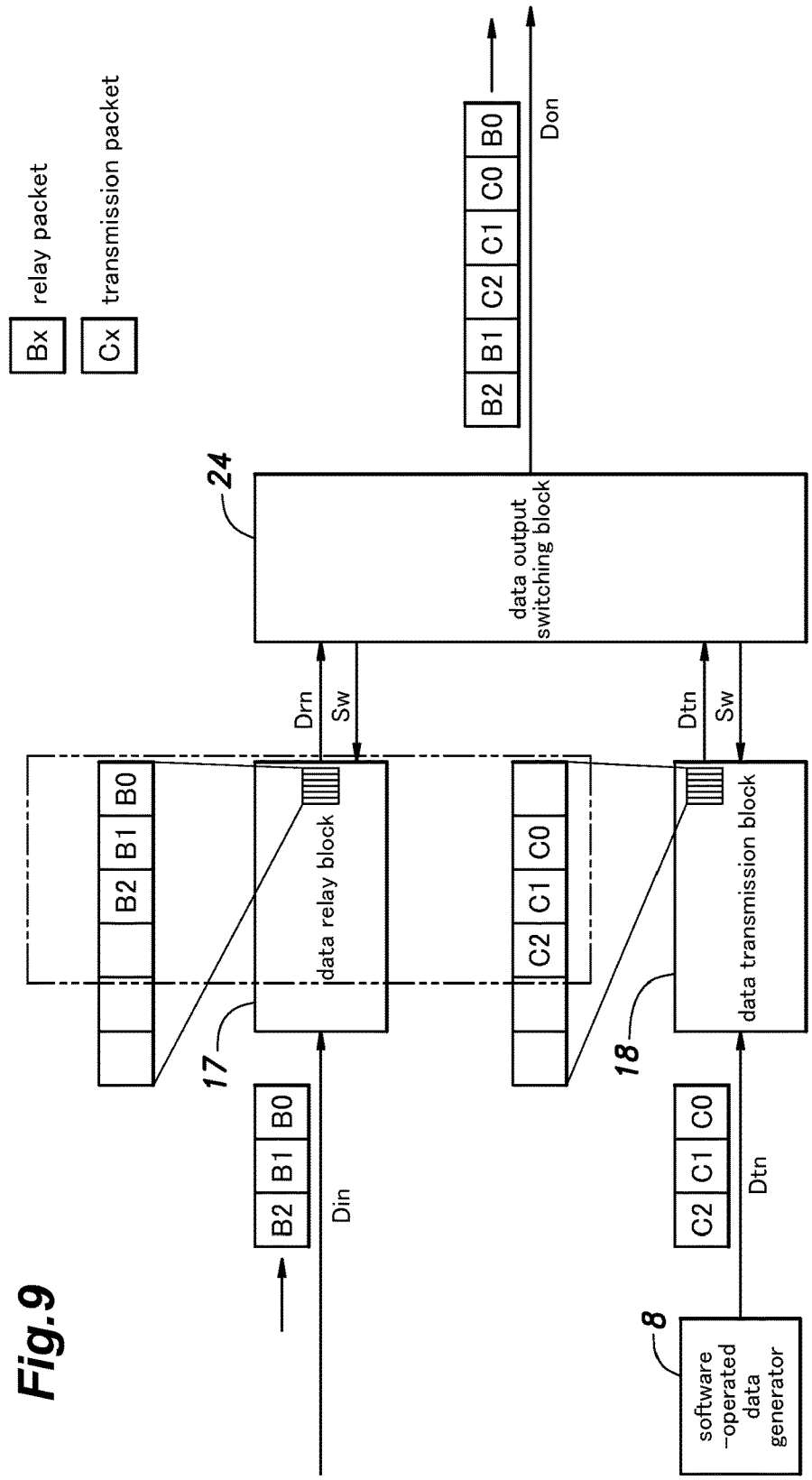
FIG. 9 is an explanatory diagram of data output switching performed by the data output switching block shown in FIG. 2.

With reference to FIG. 9, description will be made of a concrete example of the operation of the data relay block 17, data transmission block 18 and data output switching block 24. In the example shown in FIG. 9, packets B0, B1 and B2 each containing ordinary input data Din are input to the data relay block 17 in this order as packets transmitted from another node 2 (packets B0, B1 and B2 are output from the data relay block 17 as packets containing ordinary relay data Drn). On the other hand, packets C0, C1, C2 each containing ordinary transmission data Dtn and read out from the transmission and reception buffer 16 (FIG. 6) in accordance with items of transmission data information DIt from the software-operated data generator 8 (though in FIG. 9, the packets C0, C1, C2 are shown as being directly output from the software-operated data generator 8 for the sake of simplicity of illustration) are input to the data transmission block 18 in this order at such a timing that the packet C0 is input simultaneously with the packet B1.

In this case, after outputting the packet B0 containing ordinary relay data Drn that was input first, the data output switching block 24 does not output the packets B (B1, B2) containing ordinary relay data Drn, and instead preferentially outputs the packets C (C0, C1, C2) each containing ordinary transmission data Dtn. Then, after the output of the packets C containing ordinary transmission data Dtn is completed, the data output switching block 24 outputs the packets B1, B2 containing ordinary relay data Drn. By thus switching the output data by the data output switching block 24, data collisions are avoided.

Though detailed illustration in the drawings is omitted, it should be appreciated that the interrupt relay block 19 (FIG. 2) has a function similar to that of the data relay block 17 (FIG. 2, FIG. 5). Specifically, in the interrupt relay block 19, a packet determination unit performs a relay determination with respect to the interrupt input data Dii based on the source node ID (SID) and the number of relays (HOP). Based on the result of determination by the packet determination unit, a control unit relays or discards the interrupt input data Dii. Not all of the specific functions of the functional units of the interrupt relay block 19 are described here because they are similar to those of the corresponding functional units of the data relay block 17. However, it should be appreciated that in the interrupt relay block 19, when it is determined by the packet determination unit that the interrupt input data Dii is normal and should be interrupt relay data Dri that is to be relayed, the control unit increments the number of relays of the interrupt input data Dii and thereafter sends out the interrupt input data Dii as the interrupt relay data Dri.

Figure 10:
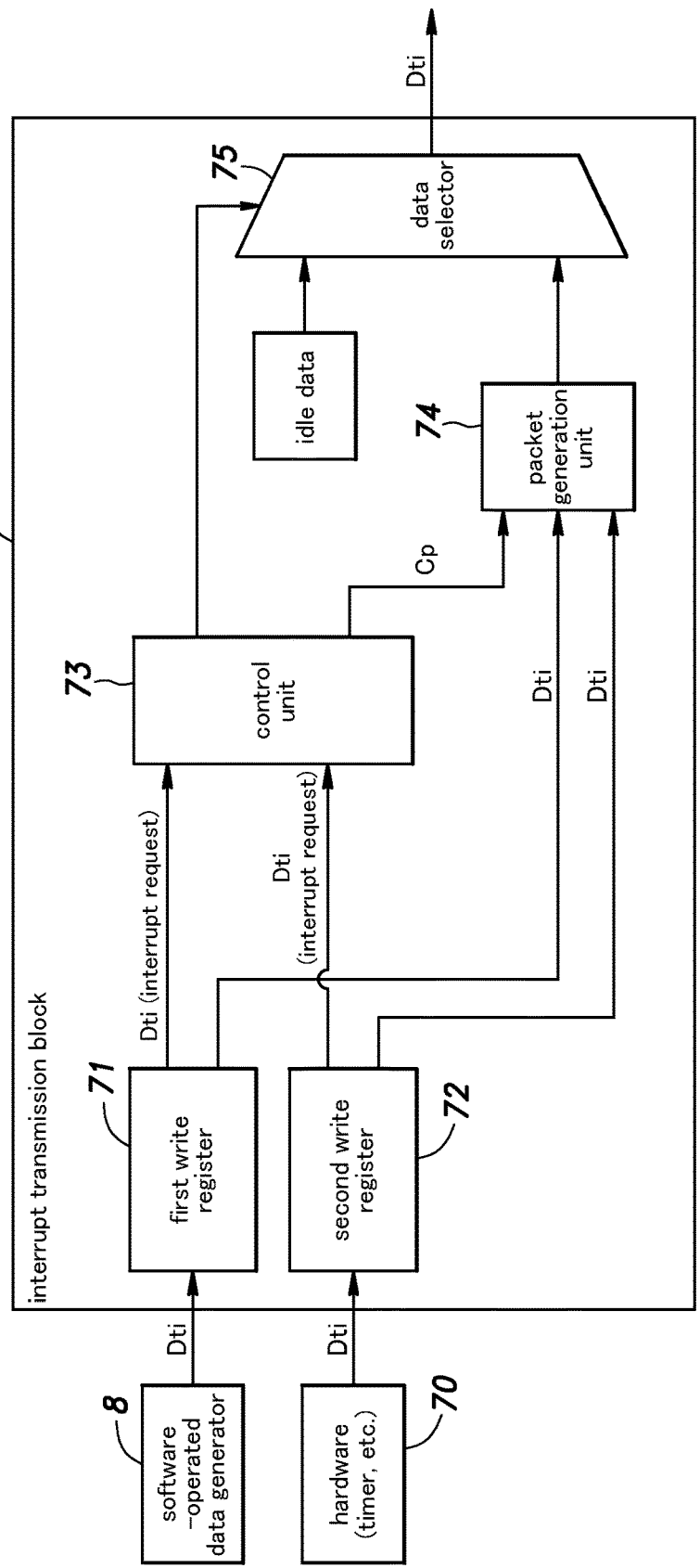
FIG. 10 is a functional block diagram of interrupt accepting block shown in FIG. 2.

As shown in FIG. 10, the interrupt transmission block 20 is configured to directly receive interrupt transmission data Dti generated by the software-operated data generator 8 (namely, receives interrupt transmission data Dti itself, instead of the transmission data information DIt of the interrupt transmission data Dti). The interrupt transmission block 20 is also configured to receive interrupt transmission data Dti sent out from other hardware 70 such as a timer. The interrupt transmission data Dti input from the software-operated data generator 8 is written in a first write register 71. On the other hand, the interrupt transmission data Dti input from the hardware 70 is written in a second write register 72.

In the interrupt transmission block 20, a control unit 73 is configured to receive the interrupt transmission data Dti written in each of the first write register 71 and the second write register 72 as an interrupt request, and upon receipt of the interrupt request, send out a packet generation command Cp to a packet generation unit 74. In such an operation, the control unit 73 accepts the interrupt request from the second write register 72 more preferentially than the interrupt request from the first write register 71. Further, the control unit 73 controls data selection performed by a later-described data selector 75.

Upon receipt of the packet generation command Cp, the packet generation unit 74 reads out the interrupt transmission data Dti from the first write register 71 or the second write register 72 that corresponds to the packet generation command Cp, and generates a packet (interrupt packet) containing the read-out interrupt transmission data Dti. The packet generation unit 74 sends out the generated packet containing the interrupt transmission data Dti to the data selector 75. The data selector 75 selects one of idle data and the packet containing the interrupt transmission data Dti in accordance with an instruction from the control unit 73 and sends out the selected data as interrupt transmission data Dti.

Though detailed illustration in the drawings is omitted, the interrupt output switching block 25 shown in FIG. 2 has an output switching function similar to that of the data output switching block 24 (FIG. 2, FIG. 8) but the output switching function of the interrupt output switching block 25 relates to the interrupt relay data Dri sent out from the interrupt relay block 19 and the interrupt transmission data Dti sent out from the interrupt transmission block 20. Specifically, the interrupt output switching block 25 includes a data selector and a control unit, to each of which the interrupt relay data Dri and the interrupt transmission data Dti are input, and the control unit controls data selection performed by the data selector based on the interrupt relay data Dri and the interrupt transmission data Dti input thereto. The data selector selects one of the interrupt relay data Dri and the interrupt transmission data Dti in accordance with an instruction from the control unit, and outputs the selected data as interrupt send-out data Doi. The control unit outputs the instruction so as to cause the data selector to output the interrupt transmission data Dti more preferentially than the interrupt relay data Dri.

The functions of the output switching block 26 shown in FIG. 2 will be described below, also without detailed illustration in the drawings. The output switching block 26 has an output switching function similar to that of the data output switching block 24 or the interrupt output switching block 25 but the output switching function of the output switching block 26 relates to the ordinary send-out data Don sent out from the data output switching block 24 (FIG. 2, FIG. 8) and the interrupt send-out data Doi sent out from the interrupt output switching block 25 (FIG. 2). Specifically, the output switching block 26 includes a data selector and a control unit, to each of which the ordinary send-out data Don and the interrupt send-out data Doi are input, and the control unit controls data selection performed by the data selector based on the ordinary send-out data Don and the interrupt send-out data Doi input thereto. The data selector selects one of the ordinary send-out data Don and the interrupt send-out data Doi in accordance with an instruction from the control unit, and sends out the selected data as output data Do. The control unit outputs the instruction so as to cause the data selector to output the interrupt send-out data Doi more preferentially than the ordinary send-out data Don.

Figure 11:
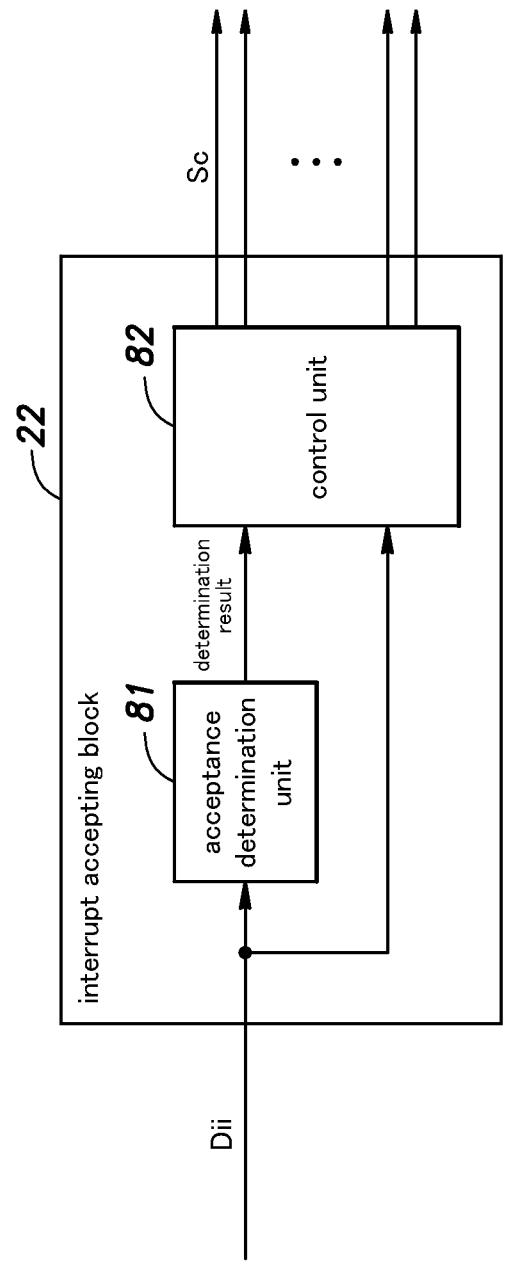
FIG. 11 is a functional block diagram of interrupt transmission block shown in FIG. 2.

As shown in FIG. 11, in the interrupt accepting block 22, an acceptance determination unit 81 analyzes the reception data information DIr of the interrupt input data Dii that has been input, and executes an acceptance determination to determine whether to accept the interrupt input data Dii on the basis of the analysis result. Specifically, the acceptance determination unit 81 determines to accept the interrupt input data Dii when the destination node ID (DID) of the interrupt input data Dii indicates the own node, and determines not to accept the interrupt input data Dii when the destination node ID does not indicate the own node or when the interrupt input data Dii is error data.

In the interrupt accepting block 22, when a control unit 82 is provided with a determination result from the acceptance determination unit 81 that the interrupt input data Dii should be accepted, the control unit 82 accepts the interrupt input data Dii input thereto, and analyzes the interrupt input data Dii and, based on the analysis result, outputs a hardware control signal Sc toward a corresponding hardware. Namely, the hardware control signal Sc may be a control signal for controlling the hardware serving as the control target 7 of the software-operated controller 9 (FIG. 2) (e.g., motor driver for regulating the supply power provided to an electric motor for driving a joint of a robot) or for controlling other hardware associated with the node 2.

The hardware controlled by the hardware control signal Sc may be a hardware logic circuit such as an ASIC, a PLD, an ASSP, an IC (a reset IC, etc.) and so on. Preferably, the hardware consists of a custom-designed hardware logic circuit such as an ASIC and a PLD. When the hardware is an ASIC, it may be a master slice type such as a gate array, a structured ASIC, etc. or may be a custom type such as a cell-based ASIC, etc. When the hardware is a PLD, it may be a PLD in a narrow sense including a Simple PLD and a CPLD or may be a PLD in a wide sense which further includes an FPGA. Preferably, the hardware consists of a PLD.

In the following, description will be made of the kinds and contents of the hardware control signal Sc and the operation conducted in accordance therewith.

First, explanation will be made of a case where the hardware control signal Sc output from the interrupt accepting unit 15 is for controlling the hardware serving as the control target 7 of the software-operated controller 9.

Figure 12:
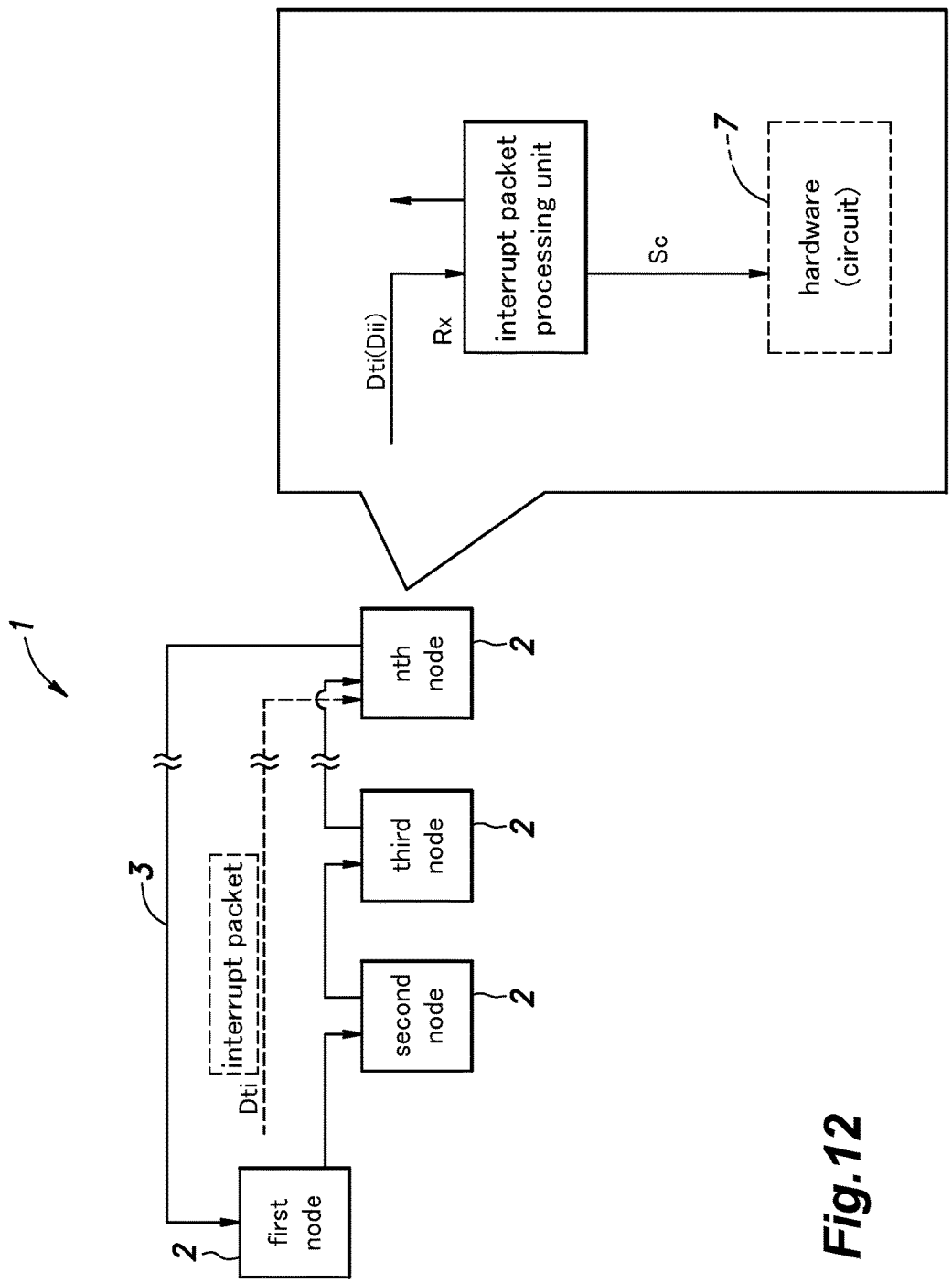
FIG. 12 is an explanatory diagram of processing initiated by an interrupt command.

As shown in FIG. 12, in this example, the communication system 1 is constituted of an n number of nodes 2 (referred to as first, second, . . . , and nth nodes in the direction of data transmission in the ring of the network 3). The first node 2 generates interrupt transmission data Dti whose destination is the nth node 2, and transmits a packet (interrupt packet) containing the interrupt transmission data Dti to a downstream side of the ring of the network 3 as output data Do. The interrupt packet is relayed through the second node 2, the third node 2 and so on until it is delivered to the nth node 2.

In the nth node 2, the interrupt accepting unit 15 serving as an interrupt packet processing unit receives (and accepts) the interrupt packet (the interrupt transmission data Dti) as interrupt input data Dii. Based on the interrupt input data Dii received, a hardware control signal Sc is output to the hardware corresponding to the interrupt pin number (INT) in the interrupt input data (more specifically, the control signal Sc is output to an interrupt pin of the control target 7). The hardware (such as a logic circuit) to which the hardware control signal Sc is input is controlled directly based on the hardware control signal Sc.

Figure 13:
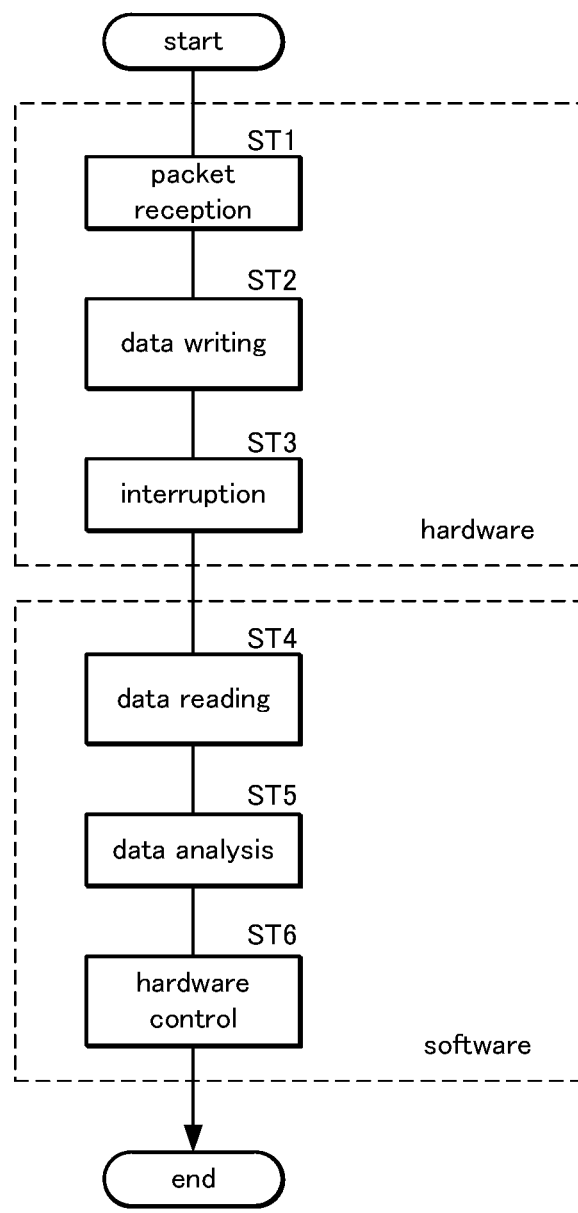
FIG. 13 is a flowchart of processing at an ordinary time.

Next, description will be made of a difference in the processing between a case where the hardware is controlled by the software-operated controller 9 and a case where the hardware is controlled directly by the hardware control signal Sc. FIG. 13 is a flowchart of processing at an ordinary time, in which the hardware is controlled by the software-operated controller 9, and FIG. 14 is a flowchart of processing at the time of interruption, in which the hardware is controlled directly by the hardware control signal Sc.

As shown in FIG. 13, at an ordinary time in which the hardware is controlled by the software-operated controller 9, the nth node 2 first receives (and accepts) a data packet containing ordinary input data Din at the data accepting block 21 (FIG. 2, FIG. 7) (step ST1). Then, the nth node 2 writes the received ordinary input data Din in the transmission and reception buffer 16 as reception data Dinr (step ST2). Thereafter, the nth node 2 performs interruption in accordance with the priority of the reception data information DIr stored in the reception data information storage buffer 50 (FIG. 7) (step ST3). The processes up to this point are executed only by the hardware implementing the network controller 5.

Subsequently, the software-operated controller 9 (FIG. 2, FIG. 7) of the nth node 2 reads out the ordinary input data Din (reception data Dinr) from the transmission and reception buffer 16 (step ST4). Thereafter, the software-operated controller 9 of the nth node 2 analyzes and arithmetically processes the ordinary input data Din (step ST5). Then, the nth node 2 controls the hardware based on the analyzed and arithmetically processed data (step ST6). The processes from step ST4 to step ST6 are executed by the CPU 4 as an arithmetic processing using software.

Figure 14:
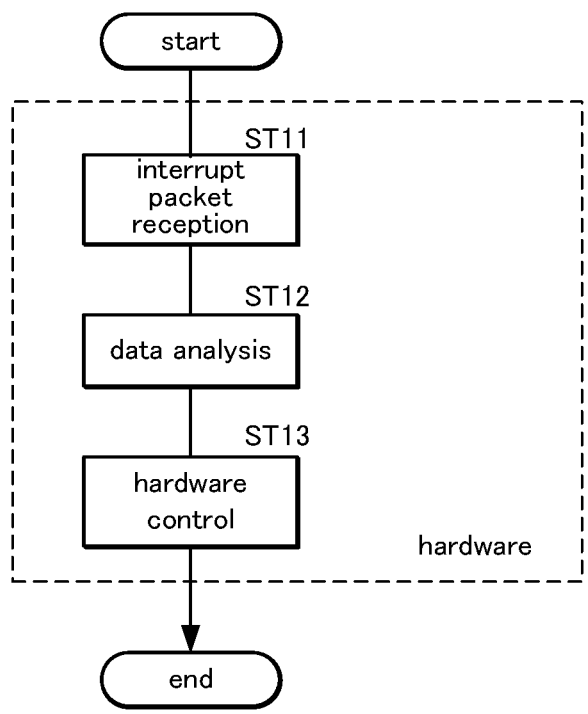
FIG. 14 is a flowchart of processing at the time of interrupt.

On the other hand, as shown in FIG. 14, in the processing at the time of interrupt, in which the hardware is controlled directly by the hardware control signal Sc, the nth node 2 first receives (and accepts) a packet (interrupt packet) containing interrupt input data Dii at the acceptance determination unit 81 (FIG. 11) of the interrupt accepting block 22 (FIG. 2) (step ST11). Then, the control unit 82 (FIG. 11) of the nth node 2 analyzes the received interrupt input data Dii (step ST12). Thereafter, based on the interrupt input data Dii, the control unit 82 of the nth node 2 outputs a hardware control signal Sc to a corresponding hardware to control the hardware directly without via software. Thus, all processes in these steps ST11-ST13 are executed only by the hardware implementing the network controller 5.

As described above, since the first node 2 transmits the interrupt transmission data Dti to the nth node 2 and the nth node 2 controls an associated hardware directly based on the received interrupt input data Dii without via software (software-operated controller 9), the hardware can be controlled with a small latency. Further, even when the software-operated data generator 8 or the software-operated controller 9 of the nth node 2 runs out of control or the CPU 4 is hung up, it is possible to control the hardware by the interrupt transmission data Dti because the control of the hardware by the interrupt transmission data Dti is executed without via software.

The first node 2 may generate items of interrupt transmission data Dti for a plurality of nodes 2 and transmit packets (interrupt packets) corresponding to the generated items of interrupt transmission data Dti sequentially but substantially simultaneously to a downstream side of the ring of the network 3 as items of output data Do. Thereby, the items of hardware of the plurality (two or more) of nodes 2 to which the items of interrupt transmission data Dti are addressed are controlled by the items of interrupt transmission data Dti, whereby the operations of the items of hardware (namely, control targets 7) of these nodes 2 can be synchronized.

Next, description will be made of a case where the hardware control signal Sc output from the interrupt accepting unit 15 is for controlling hardware other than the control target 7 of the software-operated controller 9.

Figure 15:
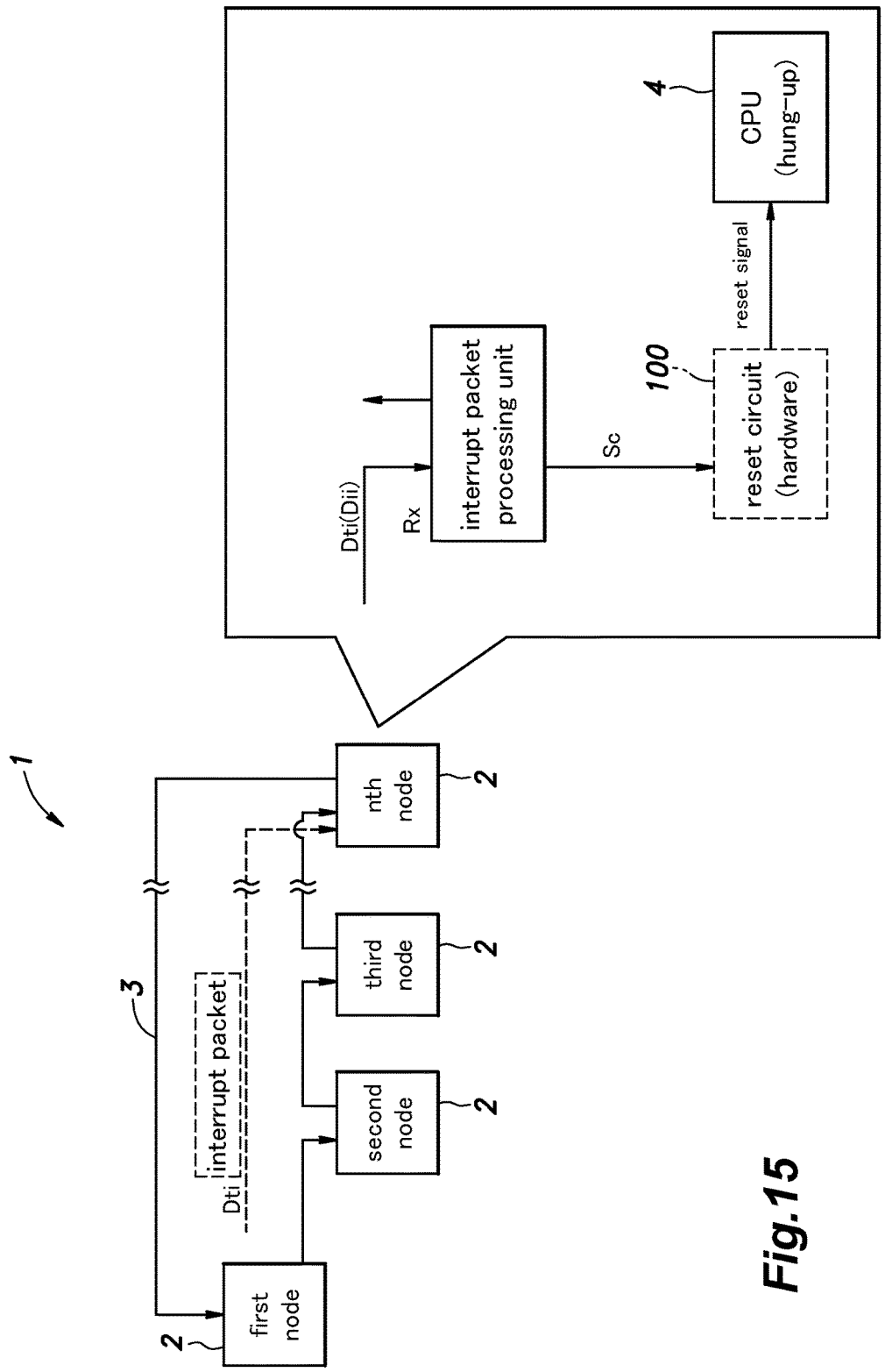
FIG. 15 is an explanatory diagram of a restart process executed in response to an interrupt.

As shown in FIG. 15, in this example, the first node 2 transmits interrupt transmission data Dti to the nth node 2 in a "hung up" state to control hardware (reset circuit 100) for resetting the CPU 4.

In the nth node 2, the interrupt accepting unit 15 serving as an interrupt packet processing unit receives (and accepts) the interrupt packet (interrupt transmission data Dti) as interrupt input data Dii. Based on the interrupt input data Dii received, a hardware control signal Sc is output to an interrupt pin of the reset circuit 100 (hardware) corresponding to the interrupt pin number (INT) in the interrupt input data. The hardware (reset circuit 100) to which the hardware control signal Sc is input is controlled directly based on the hardware control signal Sc, and outputs a reset signal to the hung-up CPU 4 (namely, restarts (reboots) the software).

Thus, by transmitting interrupt transmission data Dti for controlling the hardware (reset circuit 100) from the first node 2 to the nth node 2 separately from that for directly controlling the control target 7 of the software-operated controller 9 as described above, it is possible to reset the hung-up CPU 4 of the nth node 2. This makes it possible to bring the software-operated data generator 8 or the software-operated controller 9 of the nth node 2 back to a normal state.

On the other hand, there may be a case where the CPU 4 is not restarted normally even when the hardware control signal Sc for the reset circuit 100 is transmitted and the reset signal is output to the CPU 4, and in such a case, the software-operated data generator 8 may continue to be out of control and send out unnecessary data. When the network 3 is a ring network as in the present embodiment, if such a case occurs, the relay data Dr becomes unable to be relayed (transmitted) because the unnecessary data (transmission data Dt) is processed preferentially than the relay data Dr. Therefore, in the present embodiment, interrupt transmission data Dti for controlling a yet other hardware is transmitted to the runaway node 2 (namely, the node 2 in which the software-operated data generator 8 is running out of control) from another node 2 to solve the problem.

Figure 16:
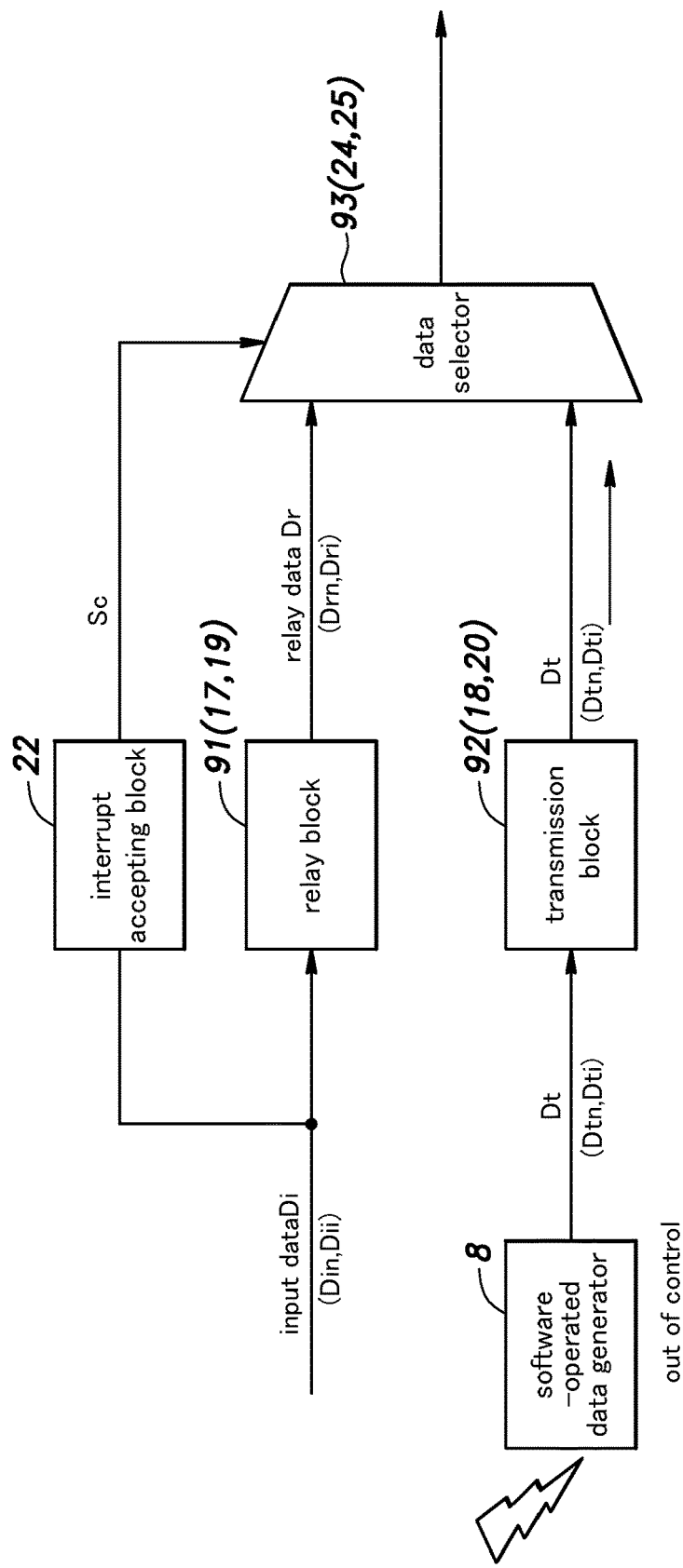
FIG. 16 is a flowchart of a system restoration process initiated by an interrupt at the time of occurrence of an abnormality.

More specific explanation will be made with reference to an example shown in FIG. 16, in which input data Di (ordinary input data Din and interrupt input data Dii) is input to a relay block 91 (summarily refers to the data relay block 17 and the interrupt relay block 19) of a node 2. In this example, the software-operated data generator 8 of this node 2 is running out of control and, as a result, a transmission block 92 (summarily refers to the data transmission block 18 and the interrupt transmission block 20) keeps outputting transmission data Dt (ordinary transmission data Dtn and interrupt transmission data Dti) generated by the software-operated data generator 8. A data selector 93 (summarily refers to the data output switching block 24 and the interrupt output switching block 25) outputs the ordinary transmission data Dtn generated by the software-operated data generator 8 more preferentially than the ordinary relay data Drn corresponding to the ordinary input data Din and outputs the interrupt transmission data Dti generated by the software-operated data generator 8 more preferentially than the interrupt relay data Dri corresponding to the interrupt input data Dii, and therefore, the relay data Dr (ordinary relay data Drn and interrupt relay data Dri) necessary for another node 2 cannot be output.

In such a case, by transmitting interrupt transmission data Dti from another normal node 2 to the runaway node 2 (the interrupt transmission data Dti is received as interrupt input data Dii by the runaway node 2) such that the interrupt transmission data Dti causes the output of the data selector 93, which is constituted of hardware, to be switched to the input data Di side, it is possible for the normal node 2 to control the data selector 93 of the runaway node 2 such that the data selector 93 outputs the relay data Dr.

Figure 17A:
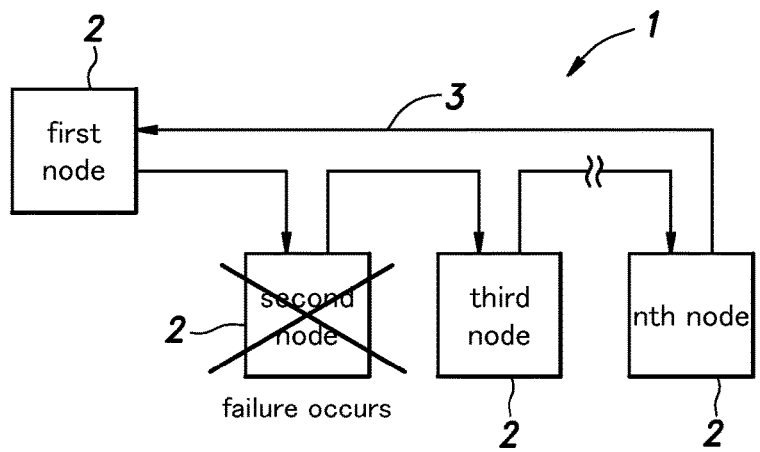
FIGS. 17A-17C are diagrams for explaining a bypass process shown in FIG. 16.
Figure 17B:
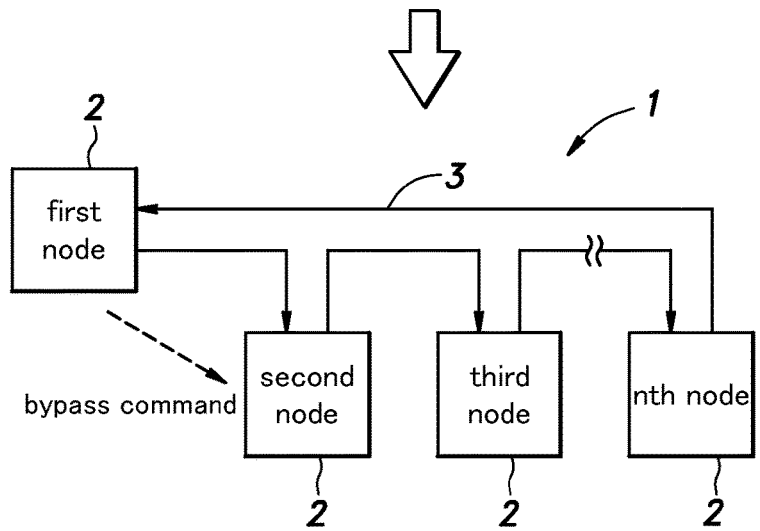
Figure 17C:
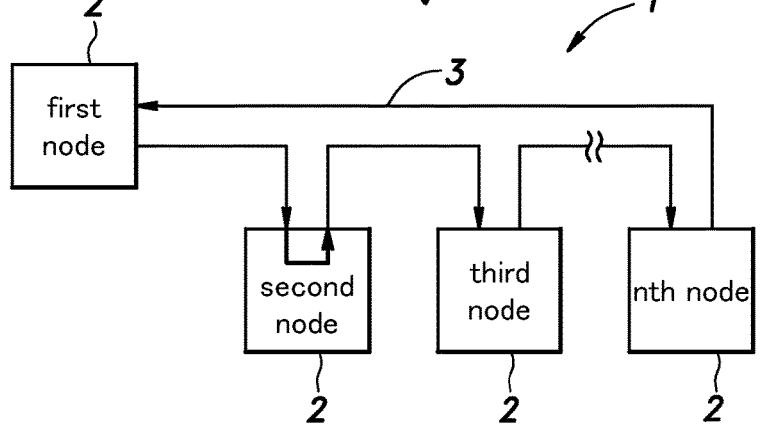

For example, as shown in FIG. 17A, when a failure occurs at the second node 2, which is one of the plurality of nodes of the communication system 1, the first node 2, which is one of the normal nodes 2, transmits interrupt transmission data Dti to the second node 2 where the failure has occurred, such that the interrupt transmission data Dti causes the output of the data selector 93 of the second node 2 to be switched to the input data Di side as shown in FIG. 17B. As a result, as shown in FIG. 17C, the second node 2 at which the failure has occurred stops transmitting the transmission data Dt generated by itself and outputs only the relay data Dr input thereto, namely, the relay data Dr being transferred on the network 3 bypasses the second node 2. It is to be noted that even in this case, it is possible for the first node 2, which is operating normally, to control the control target 7 of the second node 2 at which the failure has occurred by sending it the interrupt transmission data Dti.

Figure 18:
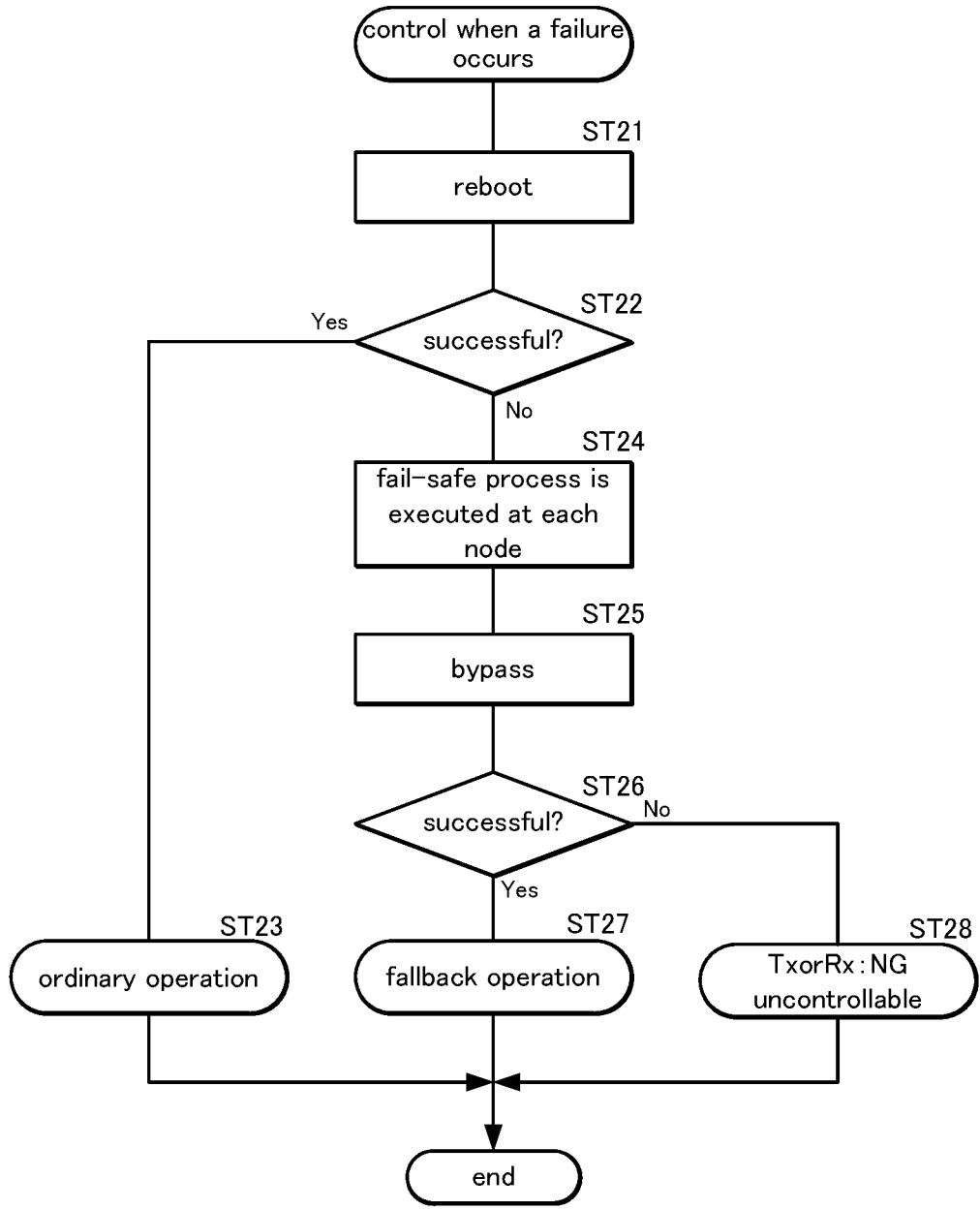
FIG. 18 is an explanatory diagram of a bypass process shown in FIG. 16.

The control procedure at the time of occurrence of a failure can be described as follows with reference to the flowchart of FIG. 18. When a failure occurs at one node 2, the communication system 1 executes the following process. First, one of the normal nodes 2 transmits interrupt transmission data Dti to the node 2 at which the failure has occurred to reboot this node 2 (step ST21). The normal node 2 determines whether the reboot was successful (step ST22), and when the reboot was successful (step ST22: Yes), all of the nodes 2 operate ordinarily (step ST23).

On the other hand, when the reboot was not successful (step ST22: No), each of the normal nodes 2 executes a fail-safe process (step ST24). Thereafter, one of the normal nodes 2 transmits interrupt transmission data Dti to the node 2 at which the failure has occurred to cause this node 2 to execute a bypass process to switch the output of the data selector 93 to the input data Di side (step ST25). Subsequently, the normal node 2 determines whether the bypass process was successful (step ST26), and when the bypass process was successful (step ST26: Yes), performs fallback operation with limited functions and performances (step ST27). On the other hand, when the bypass process was not successful (step ST26: No), the normal node 2 assumes that the interrupt transmission data Dti did not reach the node 2 where the failure has occurred, namely, there is a break in the communication line, and determines that the node 2 where the failure has occurred is uncontrollable and stops attempting to control the same (step ST28).

As described above, when a failure such as runaway occurs at one node 2, by transmitting, from another node 2 to the node 2 where the failure has occurred, interrupt transmission data Dti to cause the node 2 where the failure has occurred to execute a bypass process such that the data output switching unit thereof outputs the data (Drn, Dri) sent out from the data relay unit, it is possible to prevent the node 2 where the failure has occurred from stopping outputting the relay data Dr (ordinary relay data Drn and interrupt relay data Dri) necessary for the other nodes 2.

Modified Embodiment

Figure 19:
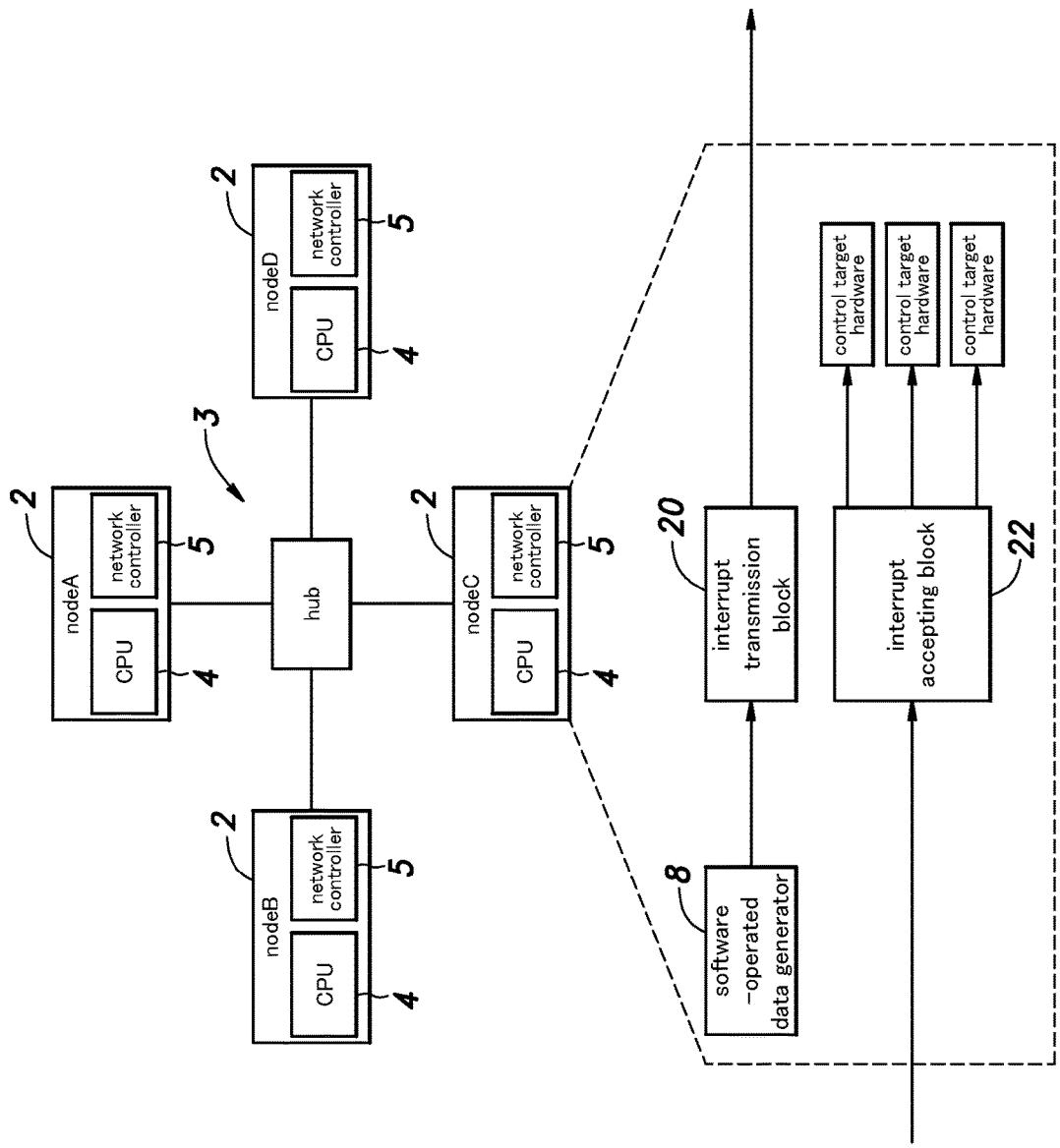
FIG. 19 is a schematic configuration diagram of a communication system according to a modified embodiment.

Next, with reference to FIG. 19, description will be made of a modification of the communication system 1 of the above-described embodiment. It is to be noted that the elements having the same or similar functions as those of the elements of the above embodiment are denoted by same reference signs and the redundant description thereof will be omitted.

In this modified embodiment, the network 3 is configured to have a physical star topology. It is to be noted that the network 3 may be a logical star topology or another topology such as a bus topology. In any case, each node 2 does not have a relay function (namely, data relay block 17, interrupt relay block 19, data output switching block 24 and interrupt output switching block 25 shown in FIG. 2). Therefore, when a failure occurs at one node 2, it will have no or a small influence on the communication between the other nodes 2, and therefore, there is no need to execute the bypass process (FIG. 17 and steps ST25 to step ST28 in FIG. 18).

On the other hand, at least two nodes 2 have a software-operated data generator 8, a software-operated controller 9, a transmission block 92 (data transmission block 18 and interrupt transmission block 20), a data accepting block 21 and an interrupt accepting block 22, such that these nodes 2 control respective control targets 7 while communicating with each other. As in the foregoing embodiment, when a failure occurs at one node 2, another node 2 transmits interrupt transmission data Dti to the node 2 where the failure has occurred to control the hardware (reset circuit) for resetting the CPU 4, whereby it is possible to reboot the node 2 where the failure has occurred. Also similarly to the foregoing embodiment, by transmitting, from one node 2 to one or more other nodes 2, interrupt transmission data Dti to directly control the hardware constituting the control target 7 of each of the one or more other nodes 2 without via software, it is possible to control the hardware of the one or more other nodes 2 with a small latency or to synchronize the operations of the hardware.

In the foregoing, the present invention has been described in terms of the concrete embodiments thereof, but the present invention is not limited to the foregoing embodiments and various alterations and modifications may be made. For instance, the network 3 is not limited to a ring, star or bus network, and may be a mesh network. In this case also, each node 2 does not need to have a relay function, and therefore, the bypass process is not necessary. Besides, the concrete structure, arrangement, number, etc. of the component parts of the embodiments as well as the processing procedures may be appropriately changed within the scope of the sprit of the present invention. Also, not all of the structural elements shown in the above embodiments are necessarily indispensable and they may be selectively used as appropriate.

The invention claimed is:

1. A communication system having a plurality of nodes communicably connected via a network,
    wherein each of the plurality of nodes comprises:
    a central processing unit (CPU) comprising:
    a software-operated data generator that executes arithmetic processing using software to generate transmission data to be transmitted to another node; and
    a software-operated controller that executes arithmetic processing using software to control hardware serving as a control target; and
    a network controller separate from the CPU and implemented by hardware, the network controller comprising:
    a data transmission unit that sends out the transmission data;
    a data accepting unit that accepts data transmitted from another node, wherein the software-operated controller of the CPU executes the arithmetic processing using software based on at least the data accepted by the data accepting unit to control the hardware serving as the control target; and
    an interrupt accepting unit that accepts interrupt data generated by another node and, based on the accepted interrupt data, outputs a hardware control signal to the hardware serving as the control target or other hardware associated with the node to directly control the hardware serving as the control target or the other hardware based on the hardware control signal without processing by the software-operated controller,
    wherein the hardware serving as the control target is separate from the CPU and the network controller, and the other hardware is separate from the CPU,
    wherein the network includes a ring network in which the plurality of nodes are communicably connected in a ring fashion so that each node sends data in one direction along the ring,
    and wherein each of the plurality of nodes further comprises:
    a data relay unit that sends out data received from an upstream side of the network to relay the data; and
    a data output switching unit that switchably outputs one of the data sent out from the data relay unit and the data sent out from the data transmission unit toward another node,
    wherein the other hardware associated with the node includes the data output switching unit,
    wherein when the interrupt data generated by the other node is a bypass command, the interrupt accepting unit is configured to output the hardware control signal to the data output switching unit, and
    wherein the data output switching unit is configured to output, in response to the hardware control signal corresponding to the bypass command, the data sent out from the data relay unit.

2. The communication system according to claim 1, wherein the hardware serving as the control target comprises a hardware logic circuit.

3. The communication system according to claim 1, wherein the interrupt accepting unit is configured to output the hardware control signal to other hardware associated with the node, the other hardware being separate from the CPU, and
    wherein the other hardware associated with the node is a reset circuit configured to reset the CPU in response to the hardware control signal corresponding to the interrupt data.

4. The communication system according to claim 1, wherein:
    the interrupt data is transmitted to the at least two of the plurality of nodes substantially simultaneously from another node; and
    the hardware serving as the control target of each of the at least two of the plurality of nodes is controlled by the hardware control signal corresponding to the interrupt data, such that operations of the hardware serving as the control targets of the at least two of the plurality of nodes are synchronized with each other.

5. The communication system according to claim 1, wherein the hardware serving as the control target is a motor driver for regulating a supply power provided to an electric motor for driving a joint of a robot.

* * * * *